(12) United States Patent
Gulick

(10) Patent No.: US 7,305,675 B1
(45) Date of Patent: Dec. 4, 2007

(54) PROCESSING TASKS WITH FAILURE RECOVERY

(75) Inventor: Dale E Gulick, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 1057 days.

(21) Appl. No.: 10/044,707

(22) Filed: Jan. 11, 2002

(51) Int. Cl.
*G06F 9/46* (2006.01)
*G06F 3/00* (2006.01)
*G06F 11/00* (2006.01)
*G06F 1/04* (2006.01)

(52) U.S. Cl. .................... 718/102; 710/19; 714/16; 713/502; 718/100

(58) Field of Classification Search ........ 718/100–108; 713/320, 502; 709/214; 710/260–266, 19; 714/100, 799, 16; 358/1.15
See application file for complete search history.

(56) References Cited

U.S. PATENT DOCUMENTS

| | | | |
|---|---|---|---|
| 5,012,409 A * | 4/1991 | Fletcher et al. ............ 718/103 |
| 5,349,656 A * | 9/1994 | Kaneko et al. ............ 718/102 |
| 5,437,039 A * | 7/1995 | Yuen ......................... 718/108 |
| 5,469,571 A * | 11/1995 | Bunnell ..................... 718/103 |
| 5,640,563 A * | 6/1997 | Carmon ..................... 718/102 |
| 5,694,604 A * | 12/1997 | Reiffin ....................... 718/107 |
| 6,128,672 A * | 10/2000 | Lindsley ..................... 710/19 |
| 6,148,322 A * | 11/2000 | Sand et al. ................. 718/103 |
| 6,243,735 B1 * | 6/2001 | Imanishi et al. ........... 718/102 |
| 6,360,243 B1 * | 3/2002 | Lindsley et al. ........... 718/103 |
| 6,430,593 B1 * | 8/2002 | Lindsley .................... 718/103 |
| 6,434,708 B1 * | 8/2002 | Dunnihoo et al. ......... 713/502 |
| 6,704,763 B1 * | 3/2004 | Gulick ....................... 718/100 |
| 6,757,897 B1 * | 6/2004 | Shi et al. ................... 718/102 |
| 6,918,053 B1 * | 7/2005 | Thatte et al. ............... 714/16 |
| 6,934,741 B2 * | 8/2005 | Shavit et al. .............. 709/214 |
| 7,020,877 B2 * | 3/2006 | Dailey ....................... 718/102 |
| 7,120,911 B1 * | 10/2006 | Katayama ................. 718/102 |
| 2002/0069233 A1 * | 6/2002 | Muller et al. ............. 709/102 |
| 2002/0097429 A1 * | 7/2002 | Ferlitsch ................... 358/1.15 |
| 2003/0061526 A1 * | 3/2003 | Hashimoto ................ 713/320 |

OTHER PUBLICATIONS

Ford et al., "Flexible Multi-Policy Scheduling Based on CPU Inheritance", Department of Computer Science, University of Utah, 1996, pp. 1-12.*
Intel, "Low Pin Count (LPC) Interface Specification Revision 1.0," pp. 1-31 (Sep. 29, 1997).
Standard Microsystems Corporation, "100 Pin Enhanced Super I/O for LPC Bus with SMBus Controller for Commercial Application," Part No. LPC47B37x, pp. 1-254 (Jun. 17, 1999).

(Continued)

*Primary Examiner*—Meng-Al T. An
*Assistant Examiner*—Jennifer N. To
(74) *Attorney, Agent, or Firm*—Williams, Morgan & Amerson, P.C.

(57) ABSTRACT

A method and apparatus is provided for processing tasks with failure recovery. The method includes storing one or more tasks in a queue, wherein each task has an associated exit routine, and determining at least one task to process based on a priority scheme. The method further includes processing the at least one task, and calling the exit routine based on determining that the task has not completed processing within a preselected period of time.

23 Claims, 16 Drawing Sheets

OTHER PUBLICATIONS

Intel, "Communication and Networking Riser Specification," Revision 1.0 (Feb. 7, 2000).

FIPS Pub 140-1 Federal Information Processing Standards Publication, "Security Requirements for Cryptographic Modules" (Jan. 11, 1994).

"Handbook of Applied Cryptography" CRC Press 1997 pp. 154-157, 160-161, 191-198, 203-212.

DMTF, "Alert Standard Format (ASF) Specification" DSP0114, Version 1.03, Jun. 20, 2001.

Intel, "Advanced Configuration and Power Interface Specification," Revision 1.0b, Feb. 2, 1999.

Intel, "Advanced Configuration and Power Interface Specification," Revision 2.0, Jul. 27, 2000.

Intel, "Advanced Configuration and Power Interface Specification," Revision 2.0 Errata, Errata Document Rev. 1.5, Apr. 13, 2001.

Case, Fedor, Schoffstall, Davin, "A Simple Network Management Protocol (SNMP)" May, 1990.

"Network Device Class Power Management Reference Specification," Version 210, Oct. 12, 2000 pp. 1-9.

Intel, "IPMI Intelligent Platform Management Interface Specification v 1.0," Document Revision 1.0, Sep. 16, 1998.

Intel, "IPMI Intelligent Platform Management Interface Specification v 1.5," Document Revision 1.0, Feb. 21, 2001.

Intel, "IPMI v 1.5 Addenda, Errata, and Clarifications—Intelligent Platform Management Interface Specification v1.5, revision 1.0," Addendum Document Revision 3, May 16, 2001.

Intel, "IPMI Platform Management FRU Information Storage Definition v1.0," Document Revision 1.0, Sep. 16, 1998.

Socolofsky et al., "A TCP/IP Tutorial," Jan. 1991.

Intel, IPMI Platform Management FRU Information Storage Definition v1.0, Document Revision 1.1, Sep. 27, 1999.

Intel, "Metolious ACPI/Manageability," Specification v1.0, Apr. 30, 1999.

Intel, "IPMI Intelligent Platform Event Trap Format Specification v 1.0," Document Revision 1.0, Dec. 7, 1998.

DMTF, "Common Information Model (CIM) Specification," DSP0004, Version 2.2, Jun. 14, 1999.

Intel, "SMBus Control Method Interface Specification," Version 1.0, Dec. 10, 1999.

Intel, "System Management BIOS Reference Specification," Version 2.3.1, Mar. 1999.

Intel, "System Management Bus Specification," Revision 1.0, Feb. 15, 1995.

Intel, "System Management Bus (SMBus) Specification," SBS Implementers Forum, Revision 2.0, Aug. 3, 2000.

J. Postel, "User Datagram Protocol," ISI Aug. 28, 1980.

"About the 8051 Microcontroller," pp. 1-16, no date.

Intel, "8259A Programmable Interrupt Controller (8259A/8259A-2)," Dec. 1988.

Intel, "Intel® 840 Chipset Platform Design Guide," Oct. 1999.

AMD, "AMD's AlterIT™ Technology for Advanced Systems Management," Publication No. 22297 Rev. A, Dec. 1998.

AMD, "AMD-766™ Peripheral Bus Controller Data Sheet," 23167B Mar. 2001.

* cited by examiner

| Offset | Name | Description |
|---|---|---|
| 00h | Alert, Device Address (n ranges from 1 to Number of Alerts) | Contains the SMBus address to which the SMBus command is written, in the following format:<br>Bits(s) Description<br>7:1 Contains the SMBus address of the alert-capable device.<br>0 Identifies where (1) or not (0) the alerting condition is based on an exact match. |
| 01h | Alert, Command | Contains the SMBus Command or register value used to obtain the data associated with the alert. |
| 02h | Alert, Data Mask | The data-mask to be logically AND'd with to the returned sensor data to isolate significant bits associated with this alert. |
| 03h | Alert, Compare Value | The value to compare to the masked sensor data, if an exact match is specified in the Device Address field. If a match results, the alert associated with this condition should be sent by the alerting device. |
| 04h | Alert, Event Sensor Type | The value to be set into the alert's Event Sensor Type field. |
| 05h | Alert, Event Type | The value to be set into the alert's Event Type field. |
| 06h | Alert, Event Offset | The value to be set into the alert's Event Offset field. |
| 07h | Alert, Event Source Type | The value to be set into the alert's Event Source Type field. |
| 08h | Alert, Event Severity | The value to be set into the alert's Event Severity field. |
| 09h | Alert, Sensor Number | The value to be set into the alert's Sensor Number field. |
| 0Ah | Alert, Entity | The value to be set into the alert's Entity field. |
| 0Bh | Alert, Entity Instance | The value to be set into the alert's Entity Instance field. |

Fig. 7D

PROCESSING TASKS WITH FAILURE RECOVERY

BACKGROUND OF THE INVENTION

1. Field of the Invention

This invention relates generally to computing systems, and, more particularly, to processing tasks with failure recovery in a computer system.

2. Description of the Related Art

FIG. 1A illustrates an exemplary computer system 100. The computer system 100 includes a processor 102, a north bridge 104, memory 106, Advanced Graphics Port (AGP) device 108, a network interface card (NIC) 109, a Peripheral Component Interconnect (PCI) bus 110, a PCI connector 111, a south bridge 112, a battery 113, an AT Attachment (ATA) interface 114 (more commonly known as an Integrated Drive Electronics (IDE) interface), an SMBus 115, a universal serial bus (USB) interface 116, a Low Pin Count (LPC) bus 118, an input/output controller chip (SuperI/O™) 120, and BIOS memory 122. It is noted that the north bridge 104 and the south bridge 112 may include only a single chip or a plurality of chips, leading to the collective term "chipset." It is also noted that other buses, devices, and/or subsystems may be included in the computer system 100 as desired, e.g. caches, modems, parallel or serial interfaces, SCSI interfaces, etc.

The processor 102 is coupled to the north bridge 104. The north bridge 104 provides an interface between the processor 102, the memory 106, the AGP device 108, and the PCI bus 110. The south bridge 112 provides an interface between the PCI bus 110 and the peripherals, devices, and subsystems coupled to the IDE interface 114, the SMBus 115, the USB interface 116, and the LPC bus 118. The battery 113 is shown coupled to the south bridge 112. The Super I/O™ chip 120 is coupled to the LPC bus 118.

The north bridge 104 provides communications access between and/or among the processor 102, memory 106, the AGP device 108, devices coupled to the PCI bus 110, and devices and subsystems coupled to the south bridge 112. Typically, removable peripheral devices are inserted into PCI "slots," shown here as the PCI connector 111, that connect to the PCI bus 110 to couple to the computer system 100. Alternatively, devices located on a motherboard may be directly connected to the PCI bus 110. The SMBus 115 may be "integrated" with the PCI bus 110 by using pins in the PCI connector 111 for a portion of the SMBus 115 connections.

The south bridge 112 provides an interface between the PCI bus 110 and various devices and subsystems, such as a modem, a printer, keyboard, mouse, etc., which are generally coupled to the computer system 100 through the LPC bus 118, or one of its predecessors, such as an X-bus or an Industry Standard Architecture (ISA) bus. The south bridge 112 includes logic used to interface the devices to the rest of computer system 100 through the IDE interface 114, the USB interface 116, and the LPC bus 118. The south bridge 112 also includes the logic to interface with devices through the SMBus 115, an extension of the two-wire inter-IC bus protocol.

FIG. 1B illustrates certain aspects of the south bridge 112, including reserve power by the battery 113, so-called "being inside the RTC (real time clock) battery well" 125. The south bridge 112 includes south bridge (SB) RAM 126 and a clock circuit 128, both inside the RTC battery well 125. The SB RAM 126 includes CMOS RAM 126A and RTC RAM 126B. The RTC RAM 126B includes clock data 129 and checksum data 127. The south bridge 112 also includes, outside the RTC battery well 125, a CPU interface 132, power and system management units 133, and various bus interface logic circuits 134.

Time and date data from the clock circuit 128 are stored as the clock data 129 in the RTC RAM 126B. The checksum data 127 in the RTC RAM 126B may be calculated based on the CMOS RAM 126A data and stored by BIOS during the boot process, such as is described below, e.g. block 148, with respect to FIG. 2. The CPU interface 132 may include interrupt signal controllers and processor signal controllers.

FIG. 2 illustrates a prior art remote management configuration for the computer system 100. A motherboard 101 provides structural and base electrical support for the south bridge 112, the PCI bus 110, the PCI connector 111, the SMBus 115, and sensors 103A and 103B. The NIC 109, a removable add-in card, couples to the motherboard 101, the PCI bus 110, and the SMBus 115 through the PCI connector 111. The NIC 109 includes an Ethernet controller 105 and an ASF microcontroller 107. The Ethernet controller 105 communicates with a remote management server 90, passing management data and commands between the ASF microcontroller 107 and the remote management server 90. The remote management server 90 is external to the computer system 100.

An industry standard specification, generally referred to as the Alert Standard Format (ASF) Specification, defines one approach to "system manageability" using the remote management server 90. The ASF Specification defines remote control and alerting interfaces capable of operating when an operating system of a client system, such as the computer system 100, is not functioning. Generally, the remote management server 90 is configured to monitor and control one or more client systems. Typical operations of the ASF alerting interfaces include transmitting alert messages from a client to the remote management server 90, sending remote control commands from the remote management server 90 to the client(s) and responses from the client(s) to the remote management server 90, determining and transmitting to the remote management server 90 the client-specific configurations and assets, and configuring and controlling the client(s) by interacting with the operating system (s) of the client(s). In addition, the remote management server 90 communicates with the ASF NIC 109 and the client(s)' ASF NIC 109 communicates with local client sensors 103 and the local client host processor.

When the client has an ACPI-aware operating system functioning, configuration software for the ASF NIC 109 runs during a "one good boot" to store certain ASF, ACPI, and client configuration data.

The transmission protocol in ASF for sending alerts from the client to the remote management server 90 is the Platform Event Trap (PET). A PET frame consists of a plurality of fields, including GUID (globally unique identifier), sequence number, time, source of PET frame at the client, event type code, event level, sensor device that caused the alert, event data, and ID fields.

Many events may cause an alert to be sent. The events may include temperature value over or under a set-point, voltage value over or under a set-point, fan actual or predicted failure, fan speed over or under a set-point, and physical computer system intrusion. System operation errors may also be alerts, such as memory errors, data device errors, data controller errors, CPU electrical characteristic mismatches, etc. Alerts may also correspond to BIOS or firmware progression during booting or initialization of any part of the client. Operating system (OS) events may also generate alerts, such as OS boot failure or OS timeouts. The ASF Specification provides for a "heartbeat" alert with a programmable period typically one minute but not to exceed 10 minutes, when the client does not send out the heartbeat, or "I am still here," message.

Client control functions are implemented through a remote management and control protocol (RMCP) that is a user datagram protocol (UDP) based protocol. RMCP is used when the client is not running the operating system. RMCP packets are exchanged during reset, power-up, and power-down cycles, each having a different message type. The remote management server 90 determines the ASF-RMCP capabilities of the client(s) by a handshake protocol using a presence-ping-request that is acknowledged by the client(s) and followed-up with a presence-pong that indicates the ASF version being used. The remote management server 90 then sends a request to the client to indicate the configuration of the client, which the client acknowledges and follows with a message giving the configuration of the client as stored in non-volatile memory during the "one good boot." The RMCP packets include a contents field, a type field, an offset field, and a value field.

RMCP message transactions involve a request from the remote management server 90, a timed wait for an acknowledgement followed by a second timed wait for a response. If either of the time limits for the acknowledgement or the response is exceeded, then the remote management server 90 knows that either the client needs some of the packets resent or the client has lost contact due to failure of either the client or the communications link.

The ASF NIC 109 must be able to report its IP (Internet protocol) address (or equivalent) without the intervention of the operating system. Thus, the ASF NIC 109 should be able to receive and reply to ARP (Address Resolution Protocol) requests with the operating system, not interfere with ARP packets when the operating system is running, and wake-up for ARP packets when configured to do so. Note that ACPI includes waking-up for ARP packets as a standard configuration.

The following information is sent to the remote management server 90 from the client as an indication of the configuration of the client: an ACPI description table identifying sensors and their characteristics, ASF capabilities and system type for PET messages, and the client's support for RMCP and the last RCMP command; how the client configures an optional operating system boot hang failure recovery timer; and the SMBIOS identification of the UUID/GUID for PET messages. ASF objects follow the ASL (ASF Software Language) naming convention of ACPI.

Based in part on the above-described features, modem computer systems are becoming more and more robust than their predecessors. Computer systems today process a fairly large number of tasks at any given time. As the number of tasks that are processed increases, the likelihood that some of these tasks may not successful complete (because of errors, for example) also increases. Errant or hung tasks, for example, may adversely affect the performance of the computer system. As such, recovery from these failed tasks is desirable.

SUMMARY OF THE INVENTION

In one aspect of the present invention, a method is provided for processing tasks with failure recovery. The method includes storing one or more tasks in a queue, wherein each task has an associated exit routine, and determining at least one task to process based on a priority scheme. The method further includes processing the at least one task, and calling the exit routine based on determining that the task has not completed processing within a preselected period of time.

In another aspect of the invention, an apparatus is provided for processing tasks with failure recovery. The apparatus comprises a queue and a controller. The queue includes a task picker stored therein. The controller, which is communicatively coupled to the queue, is adapted to determine if at least one task other than the task picker is stored in the queue and execute the task based on determining that at least one task other than the task picker is stored in the queue. The controller is further adapted to execute the task picker in response to executing the task and to continue to execute the task picker until a preselected event occurs.

BRIEF DESCRIPTION OF THE DRAWINGS

The invention may be understood by reference to the following description taken in conjunction with the accompanying drawings, in which like reference numerals identify similar elements, and in which:

The invention may be understood by reference to the following description taken in conjunction with the accompanying drawings, in which like reference numerals identify similar elements, and in which:

FIG. 7D illustrates an exemplary address table that may be employed by the pollin engine of FIG. 7C, according to various aspects of the present invention;

Figure 1A:
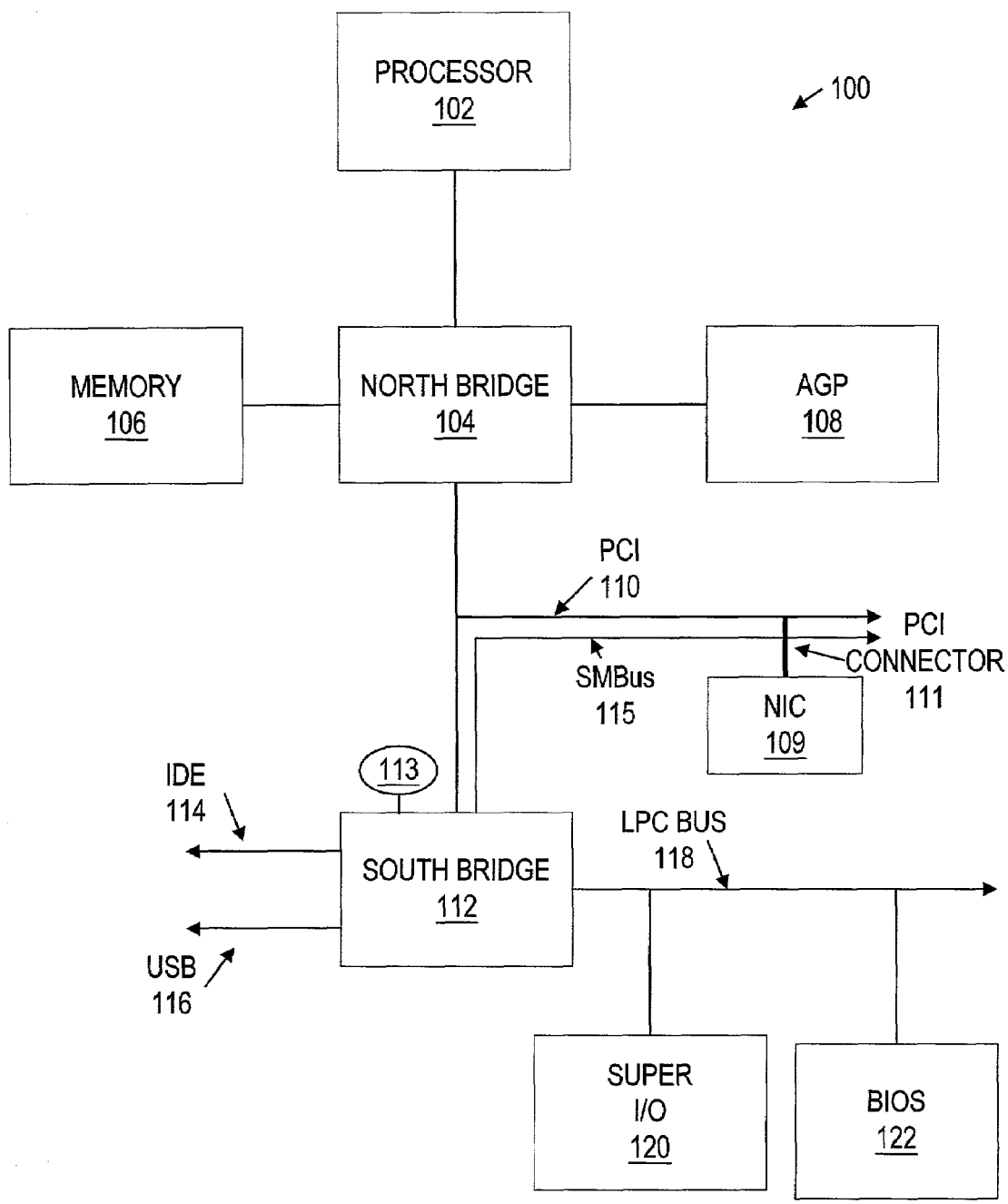
FIG. 1A illustrates a block diagram of a prior art computer system and FIG. 1B illustrates a block diagram of a prior art south bridge.
Figure 1B:
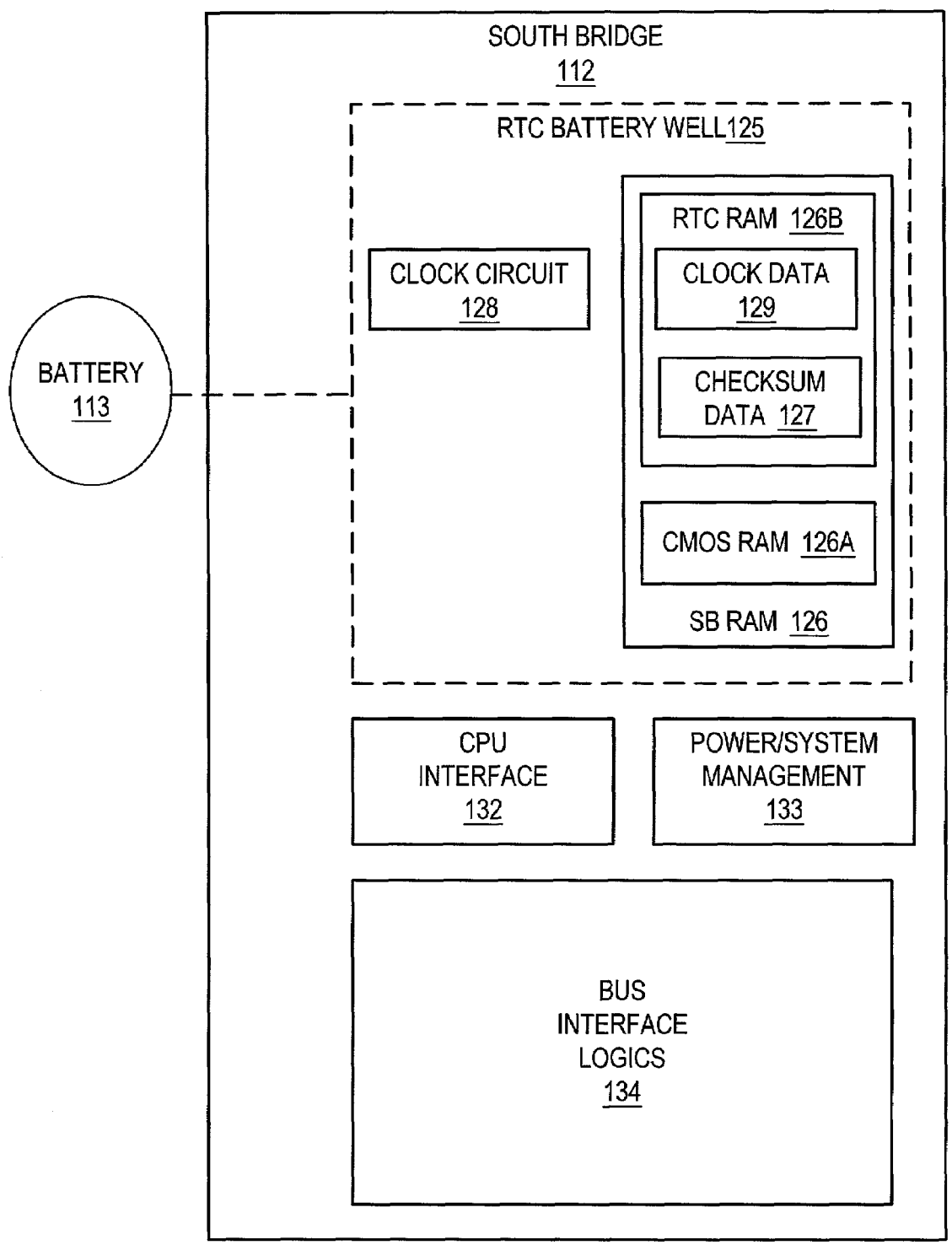

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The use of a letter in association with a reference number is intended to show alternative embodiments or examples of the item to which the reference number is connected.

The following co-pending U.S. patent applications are hereby incorporated by reference in their entireties, as if set forth fully herein:

[LPC Extension Application] "Method And Apparatus For Extending Legacy Computer Systems", U.S. patent application Ser. No. 09/544,858, filed on Apr. 7, 2000, whose inventor is Dale E. Gulick; and

[Secure Execution Mode Applications] U.S. patent application Ser. No. 09/852,372, entitled, "Secure Execution Box and Method," filed on May 10, 2001, whose inventors are Dale E. Gulick and Geoffrey S. Strongin;

U.S. patent application Ser. No. 09/852,942, entitled, "Computer System Architecture for Enhanced Security and Manageability," filed on May 10, 2001, whose inventors are Geoffrey S. Strongin and Dale E. Gulick;

U.S. patent application Ser. No. 09/853,395, entitled, "Enhanced Security and Manageability using Secure Storage in a Personal Computer System," filed on May 11, 2001, whose inventors are Geoffrey S. Strongin and Dale E. Gulick;

U.S. patent application Ser. No. 09/853,446, entitled, "Resource Sequester Mechanism," filed on May 11, 2001, whose inventor is and Dale E. Gulick;

U.S. patent application Ser. No. 09/853,447, entitled, "Integrated Circuit for Security and Manageability," filed on May 11, 2001, whose inventors are Dale E. Gulick and Geoffrey S. Strongin;

U.S. patent application Ser. No. 09/853,225, entitled, "System Management Mode Duration and Management," filed on May 11, 2001, whose inventors are Geoffrey S. Strongin and Dale E. Gulick;

U.S. patent application Ser. No. 09/853,226, entitled, "Mechanism for Closing Back Door Access Mechanisms in Personal Computer Systems," filed on May 11, 2001, whose inventor Geoffrey S. Strongin;

U.S. patent application Ser. No. 09/854,040, entitled, "Cryptographic Randomness Register for Computer System Security," filed on May 11, 2001, whose inventor is Dale E. Gulick;

U.S. patent application Ser. No. 09/853,465, entitled, "Cryptographic Command-Response Access to a Memory in a Personal Computer System," filed on May 11, 2001, whose inventor is Geoffrey S. Strongin;

U.S. patent application Ser. No. 09/853,443, entitled, "Protection Mechanism for Biometric Input Data," filed on May 11, 2001, whose inventors are Dale E. Gulick and Geoffrey S. Strongin;

U.S. patent application Ser. No. 09/853,437, entitled, "Personal Computer Security Mechanism," filed on May 11, 2001, whose inventors are Geoffrey S. Strongin and Dale E. Gulick;

U.S. patent application Ser. No. 09/853,335, entitled, "Asset Sharing between Host Processor and Security Hardware," filed on May 11, 2001, whose inventors are Geoffrey S. Strongin and Dale E. Gulick;

U.S. patent application Ser. No. 09/853,234, entitled, "Interruptible and Re-enterable System Management Mode Programming Code," filed on May 11, 2001, whose inventors are Geoffrey S. Strongin and Dale E. Gulick;

U.S. patent application Ser. No. 09/871,084, entitled, "Locking Mechanism Override and Disable for Personal Computer ROM Access Protection," filed on May 30, 2001, whose inventors are Frederick D. Weber and Dale E. Gulick;

U.S. patent application Ser. No. 09/871,511, entitled, "Monotonic Counter Mechanism for Computer System Security," filed on May 30, 2001, whose inventors Frederick D. Weber and Dale E. Gulick;

U.S. patent application Ser. No. 09/870,890, entitled, "Secure Booting of a Personal Computer System," filed on May 30, 2001, whose inventors are Geoffrey S. Strongin, Dale E. Gulick, and Frederick Weber; and U.S. patent application Ser. No. 09/870,889, entitled, "External Locking Mechanism for Personal Computer Memory Locations, filed on May 30, 2001, whose inventors are Geoffrey S. Strongin, Dale E. Gulick, and Frederick Weber.

The following non-patent documents are hereby incorporated by reference in their entirety, without prejudice and without disclaimer, as if set forth fully herein:

[ASF] *Alert Standard Format Specification*, 1.03, 20 Jun. 2001, DSP0114, and earlier version, at;

[ACPI] *Advanced Configuration and Power Interface Specification*, 2.0, 27 Jul. 2000, and earlier version;

[RFC1157] *A Simple Network Management Protocol*,

[CIM] CIM Standards,

[IPMI] *Intelligent Platform Management Interface Specification* v1.0, rev 1.1, Aug. 26, 1999, and earlier versions;

[RFC1188] *IP and ARP on FDDI Networks*,

[FRU] *IPMI Field Replaceable Unit (FRU) Information Storage Definition*, v1.0, 16 Sep. 1998, and earlier versions;

[MTLS] *Metolious ACPI/Manageability Specification*, v1.0, 30 Apr. 1999;

[NDCPM] *Network Device Class Power Management Reference Specification*, v1.0a, 21 Nov. 1997;

[PET] *Platform Event Trap Specification*, v1.0, 7 Dec. 1998, and earlier versions;

[SCMIS] *SMBus Control Method Interface Specification*, v10, 10 Dec. 1999, and earlier versions;

[SMBIOS] *System Management BIOS Reference Specification*, v2.3.1, 16 Mar. 1999, and earlier versions;

[SMBUS_2.0] *System Management Bus (SMBus) Specification*, v2.0, 03 Aug. 2000, and earlier versions, and

Figure 3A:
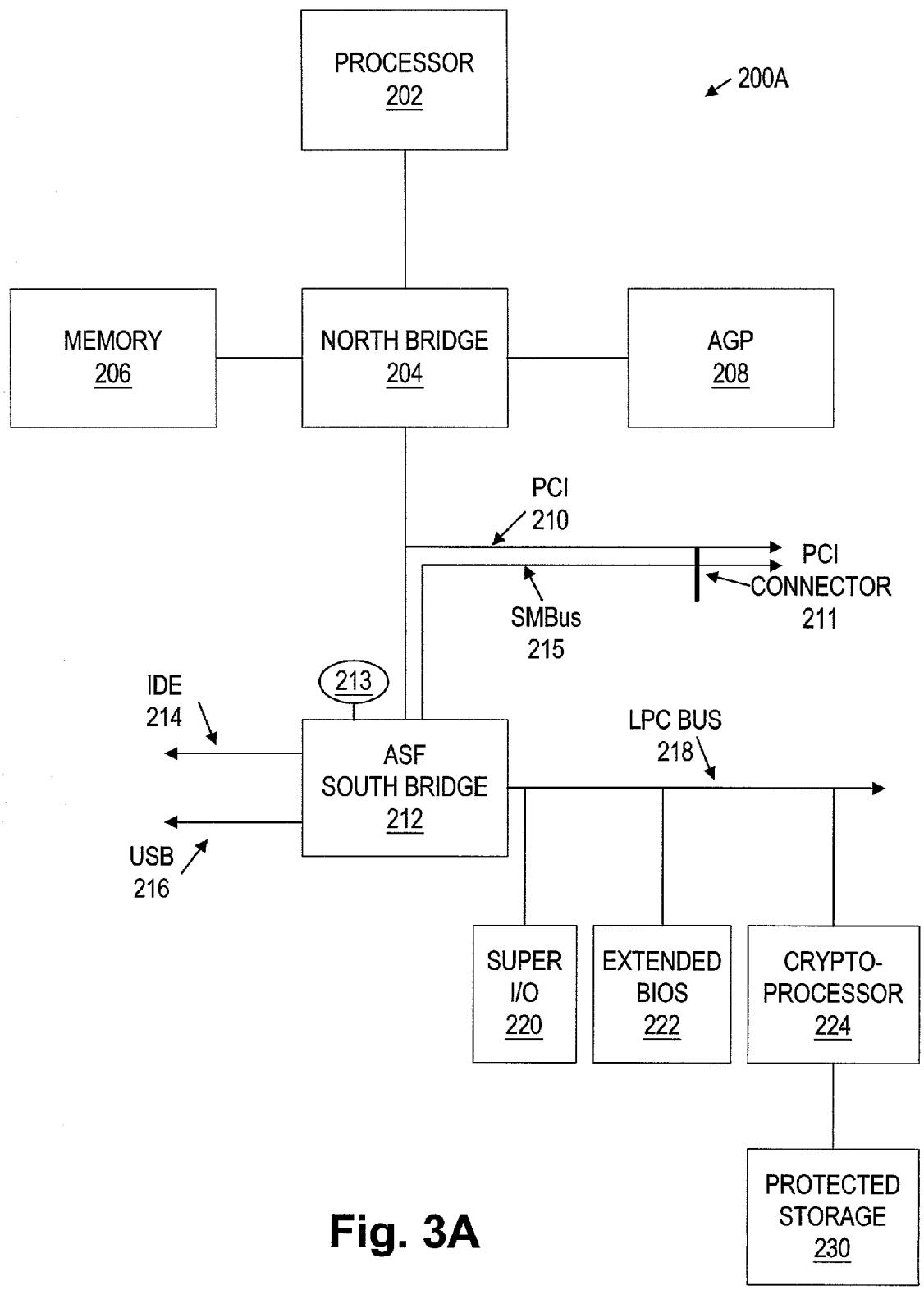
FIGS. 3A and 3B illustrate block diagrams of embodiments of computer systems having remote management arrangements, according to various aspects of the present invention.
Figure 3B:
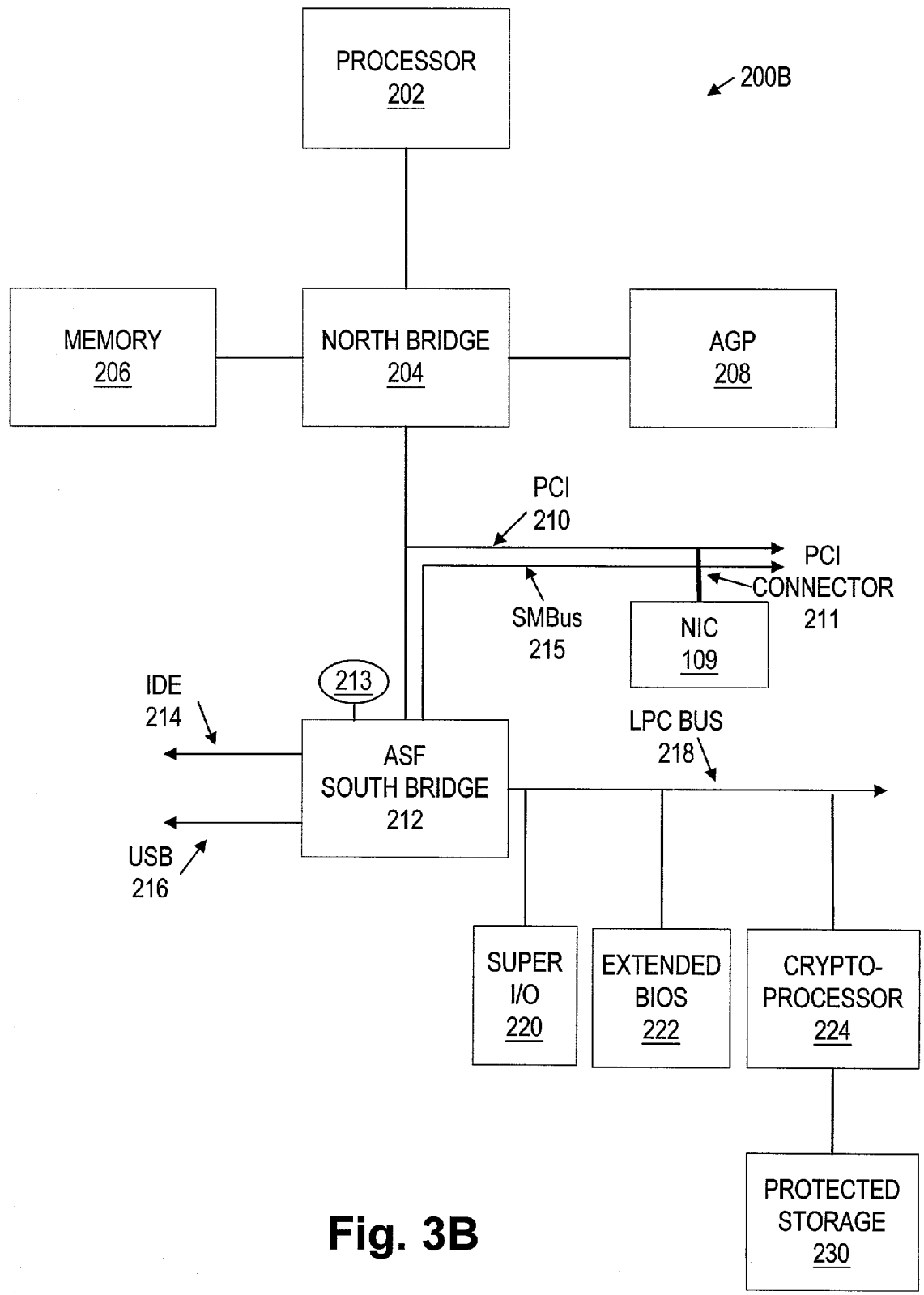

[RFC_UDP] *User Datagram Protocol*, RFC 768,

Turning now to FIGS. 3A and 3B, block diagrams of embodiments of computer systems 200A and 200B having remote management arrangements are shown, according to various aspects of the present invention. In FIG. 3A, an ASF south bridge 212 may include integrated ASF, ACPI, and/or Ethernet capabilities for improved remote manageability.

The computer system 200A of FIG. 3A includes a processor 202, a north bridge 204, memory 206, Advanced Graphics Port (AGP) device 208, a PCI bus 210, a PCI connector 211, the ASF south bridge 212, a battery 213, an AT Attachment (ATA) interface 214, an SMBus 215, a USB interface 216, an LPC bus 218, an input/output controller chip (SuperI/O™) 220, extended BIOS memory 222, and, optionally, a crypto-processor 224 and protected storage 230. It is noted that the north bridge 204 and the ASF south bridge 212 may include only a single chip or a plurality of chips in the "chipset." It is also noted that other buses, devices, and/or subsystems may be included in the computer system 200A as desired, e.g. caches, modems, parallel or serial interfaces, SCSI interfaces, etc.

The processor 202 is coupled to the north bridge 204. The north bridge 204 provides an interface between the processor 202, the memory 206, the AGP device 208, and the PCI bus 210. The ASF south bridge 212 provides an interface between the PCI bus 210 and the peripherals, devices, and subsystems coupled to the IDE interface 214, the SMBus 215, the USB interface 216, and the LPC bus 218. The battery 213 is shown coupled to the ASF south bridge 212. The Super I/O™ chip 220, the extended BIOS 222, and the crypto-processor 224 are coupled to the LPC bus 218. The protected storage 230 is coupled through the crypto-processor 224.

The north bridge 204 provides communications access between and/or among the processor 202, memory 206, the AGP device 208, devices coupled to the PCI bus 210 and devices and subsystems coupled to the ASF south bridge 212. Typically, removable peripheral devices are inserted into PCI "slots," shown here as the PCI connector 211, that connect to the PCI bus 210 to couple to the computer system 200A. Alternatively, devices located on a motherboard may be directly connected to the PCI bus 210. The SMBus 215 is shown "integrated" with the PCI bus 210 by using pins in the PCI connector 211 for a portion of the SMBus 215 connections.

The ASF south bridge 212 provides an interface between the PCI bus 210 and various devices and subsystems, such as a modem, a printer, keyboard, mouse, etc., which are generally coupled to the computer system 200A through the LPC bus 218 (or its predecessors, such as the X-bus or the ISA bus). The ASF south bridge 212 includes logic used to interface the devices to the rest of computer system 200A through the IDE interface 214, the SMBus 215, preferably supporting masters external to the ASF south bridge 212, the USB interface 216, and the LPC bus 218.

It is also noted that the operations of the LPC bus 218 may correspond to the prior art Low Pin Count Interface Specification Revision 1.0 of Sep. 29, 1997. The operations of the LPC bus 218 may also correspond to the extended LPC bus disclosed in the LPC Extension Application previously incorporated herein by reference.

The extended BIOS 222 includes additional memory locations different from or in addition to those memory locations in the BIOS memory 122. The additional memory locations may have specific read/write permissions and/or be secure memory locations. Additional details may be found in the Secure Execution Mode Applications previously incorporated herein by reference. Memory addressing for the extended BIOS 222 may be as taught in the LPC Extension Application previously incorporated herein by reference. The crypto-processor 224 may provide security for the protected storage 230. Various embodiments for accessing the protected storage 230 through the crypto-processor 224 are provided in the Secure Execution Mode Applications previously incorporated herein by reference.

As mentioned above, the ASF south bridge 212 may include integrated ASF, ACPI, and/or Ethernet functionality, according to various aspects of the present invention. As there is no ASF NIC 109 in the computer system 200A, according to one aspect of the present invention, the ASF south bridge 212 recognizes that it must be a master ASF controller for the computer system 200A, during a power-up cycle. The computer system 200A may advantageously boot faster than the computer system 100 by initiating the ASF and/or ACPI assets in the ASF south bridge 212 during the main portion of the BIOS loading since the ASF, ACPI, and/or Ethernet hardware are known to the BIOS code writer before the BIOS code is written. The BIOS code itself may then be enlarged to include any or all ASF, ACPI, and/or Ethernet initialization data and/or firmware. Additional details of various embodiments of the present invention are given below.

In FIG. 3B, the computer system 200B differs from the computer system 200A in that the computer system 200B includes the ASF NIC 109 at the PCI connector 211. In the computer system 200B, the ASF south bridge 212, according to one aspect of the present invention should recognize that it should be an ASF slave to the ASF NIC 109.

The Secure Execution Mode Applications previously incorporated herein by reference teach that power management functions may be performed inside a secure execution mode (SEM), including using security hardware integrated into the south bridge. One current standard for power management and configuration is the ACPI Specification. According to the ACPI specification, control methods, a type of instruction, tell the computer system to perform an operation. The ACPI specification does not know how to carry out any of the instructions. The ACPI specification only defines the calls, and the software must be written to carry out the calls in a proscribed manner. The proscribed manner of the ACPI specification is very restrictive. One cannot access some registers in your hardware. To access those registers, one can generate an SMI# (System Management Interrupt) to enter SMM and read these registers, as taught in the Secure Execution Mode Applications previously incorporated herein by reference. As power management has the potential to be abused e.g. change the processor voltage and frequency, raised above operating limits to destroy the processor, or lowered below operating limits leading to a denial of service, ACPI calls should be carried out in a secure manner, such as inside SEM.

Inside SEM, each ACPI request can be checked against some internal rules for safe behavior. Using terminology more completely described in the Secure Execution Mode Applications previously incorporated herein by reference, the ACPI request would be placed in an "inbox" (incoming-only memory locations in the south bridge) of a "mailbox" (one-direction-only memory locations in the south bridge), parameter values read from the inbox, the ACPI request evaluated using the inbox parameters for acceptability, and then either fulfill the request or not, based on the evaluation results. For additional details of various embodiments, see the Secure Execution Mode Applications previously incorporated herein by reference, including FIG. 6, 42A, and 42B therein.

System Management Mode (SMM) is a mode of operation in the computer system that was implemented to conserve power. The SMM was created for the fourth generation x86 processors, and is different from x86 operating mode. As newer x86 generation processors have appeared, the SMM has become relatively transparent to the operating system. That is, computer systems enter and leave the SMM with little or no impact on the operating system.

Figure 4:
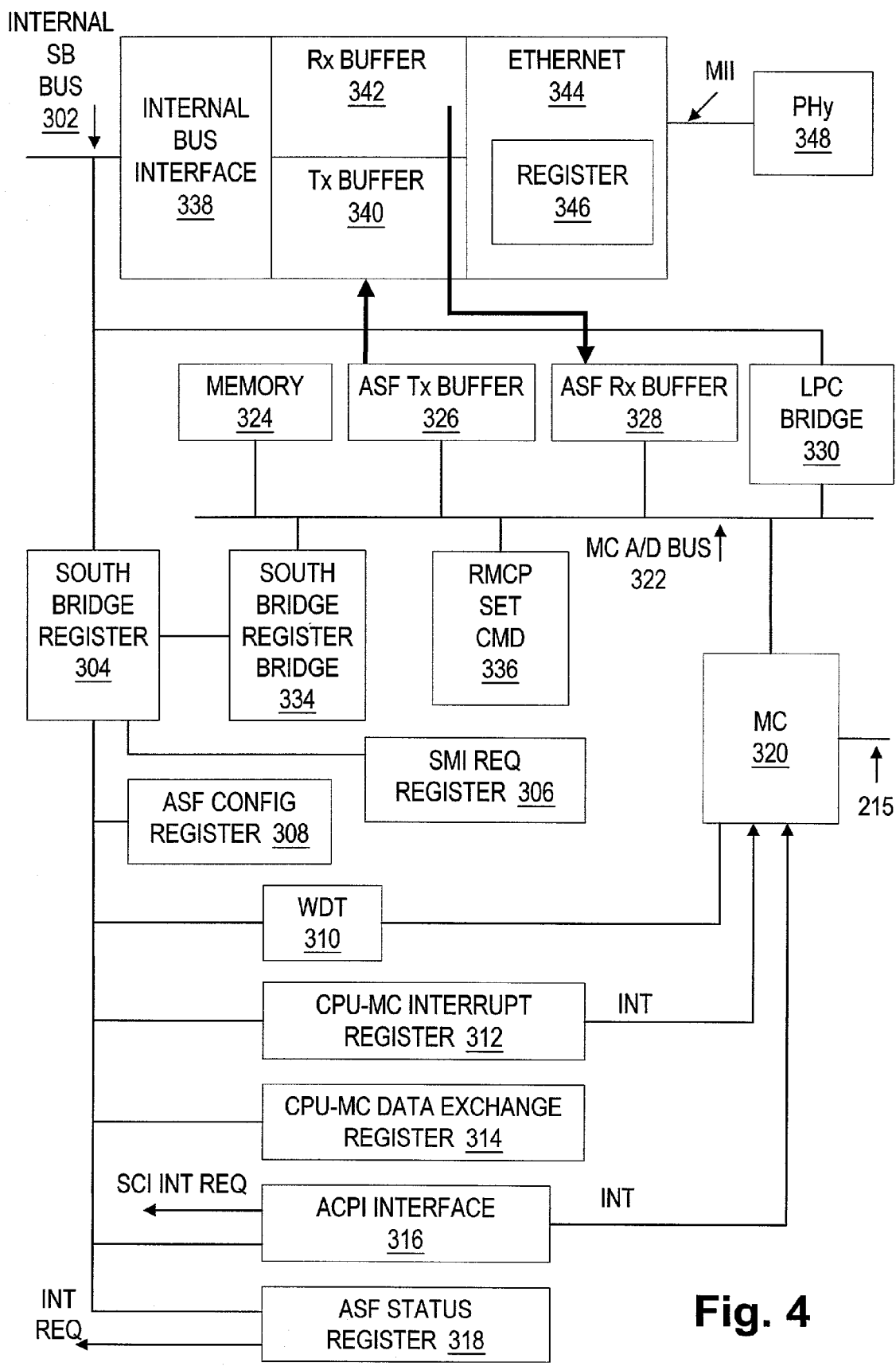
FIG. 4 illustrates a block diagram of an embodiment of an ASF south bridge including integrated ASF, ACPI, and/or Ethernet capabilities, according to various aspects of the present invention.

In FIG. 4, one embodiment of the ASF south bridge 212 is illustrated, according to various aspects of the present invention. As shown, an internal south bridge bus 302 couples a south bridge register 304 with an internal bus interface 338 of an Ethernet controller 344 and an LPC bridge 330. The south bridge register 304 also couples to an SMI request register 306, an ASF configuration register 308, a failure recovery timer (WDT) 310, a CPU-MC (microcontroller) interrupt register 312, a CPU-MC data exchange register 314, an ACPI interface 316, an ASF status register 318, and a south bridge register bridge 334. The south bridge register bridge 334 also couples to an MC address/data (A/D) bus 322.

Also coupled to the MC A/D bus 322 are a memory 324, an ASF transmit (Tx) buffer 326, an ASF receive (Rx) buffer 328, the LPC bridge 330, an RMCP set command unit 336, and an embedded microcontroller (MC) 320. The MC 320 is also coupled to the WDT 310 and coupled to receive an interrupt (INT) from the CPU-MC interrupt register 312 and the ACPI interface 316. The ACPI interface 316 also generates an SCI interrupt request. The ASF status register 318 also generates an interrupt request. The embedded Ethernet controller also includes a Rx buffer 342 coupled to the ASF Rx buffer 328, a Tx buffer 340 coupled to the ASF Tx buffer 326, and an Ethernet core 344, including a register 346. The Ethernet core 344 is shown coupled to a PHy 348 through an MII (Machine Independent Interface). The PHy 348 may be external to the ASF south bridge 212.

The MC 320 couples to the SMBus 215, not shown. The MC 320 may use software-drive I/O ports for the SMBus protocol, according to one aspect of the present invention, using so-called "chapter 13 interfaces" of the ACPI Specification, named from their definition given in chapter 13 of the ACPI Specification. In this embodiment and other embodiments, the processor (CPU) 202 can master the SMBus 215. The MC 320 may store assignable addresses in the memory 324, with fixed motherboard-resident legacy sensor addresses store in the BIOS ROM 122 or the extended BIOS 222. When the ASF NIC 109 is present and the ASF south bridge 212 is operating in slave mode, any sensors internal to the ASF south bridge 212 should be visible to the ASF NIC 109.

The embedded Ethernet controller, including the Ethernet core 344, may be configured at boot time from either BIOS code stored in the extended BIOS 222 or by the MC 320 reading values from an EEPROM, not shown, and writing the register 346. It is noted that the register 346 may include a plurality of storage locations or a plurality of registers each with one or more storage locations.

Note that the MC 320 may have some number of general-purpose I/O pins, not shown. The input pins may be used to generate panic interrupts to the MC 320. The output pins may be used to control motherboard 101 functions that are desired when the processor 202 may be "hung" and for ASF slave mode panic generation. The ASF slave mode panic generation may substitute for "pushes" of sensor 103 outputs. The general-purpose I/O inputs may generate an interrupt to the MC 320 or be polled by the MC 320, as desired.

Also note that the MC 320 may be configured to manage, control, monitor, and/or provide other functionality for the ASF south bridge 212 besides ASF. Other functionality may include security, including SEM functionality, system health checking, including ACPI, or other functionality consistent with the teachings herein.

The SMI request register 306 is configured to generate an SMI interrupt when an interrupt vector is written to the SMI request register 306. The interrupt vector is passed to an interrupt controller, not shown. It is noted that the SMI request register 306 may be in addition to or the same as the corresponding SMM initiator or SMM initiation register of the Secure Execution Mode Applications previously incorporated herein by reference.

The memory 324 may include ROM and/or RAM, as desired. The MC 320 may read configuration data from ROM in the memory 324 and shadow the configuration data in RAM in the memory 324. The configuration data may be stored in the extended BIOS 222 and shadowed in the RAM. Note that the ACPI interface 316 couples to the power/system management core 233, shown in FIG. 3, in the ASF south bridge 212.

In one embodiment, the ASF configuration register 308 is a plug and play configuration register for the MC 320 configured for ASF. While ASF is primarily used when the operating system is absent (e.g., not yet loaded at boot time or hung), ASF does interact with the operating system.

In one embodiment, the MC 320 is a conventionally available microcontroller, such as an embedded 8051 microcontroller. The 8051 microcontroller and related microcontrollers have well-known functionality in the art. Typical functionality of the 8051 microcontroller includes a central processing unit with a Boolean processor optimized for one-bit operations, five or six interrupts, with two external and two priority levels, two or three timers or counters, often 16-bit, a programmable full-duplex serial port with data rate defined by one of the timers, 32 I/O lines often as four 8-bit ports, RAM, and optional ROM. The 8051 microcontroller is known to exist in a multitude of varieties, each variation being embraced herein. Other microcontroller and microprocessor designs are also contemplated as the MC 320.

Figure 5:
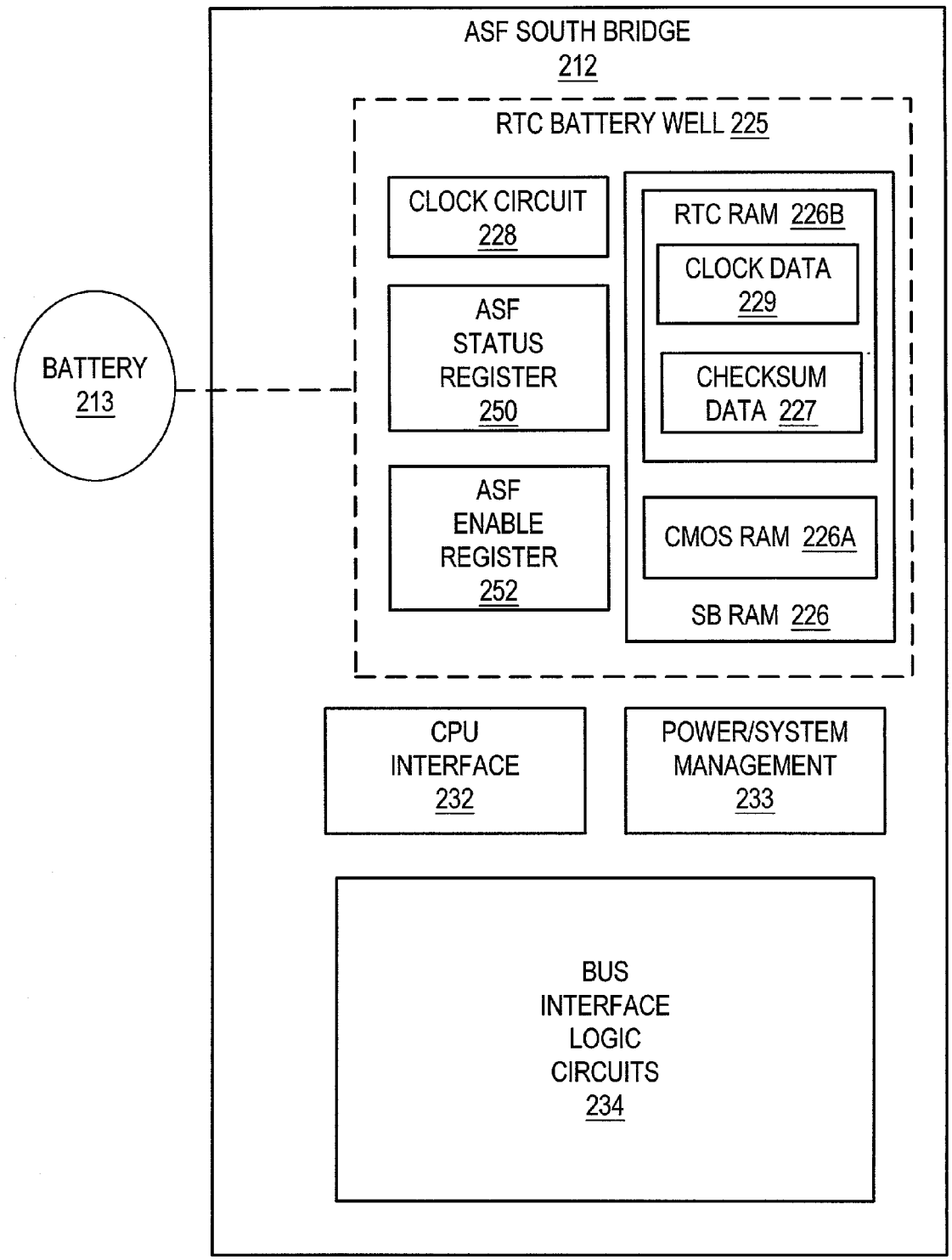
FIG. 5 illustrates one particular embodiment of the RTC battery well of the ASF south bridge that was first shown in FIG. 3A.

FIG. 5 illustrates the RTC battery well 225 of the ASF south bridge 212, according to the present invention. In addition to SB RAM 226, divided into CMOS RAM 226A and RTC RAM 226B, the RTC battery well 225 includes a clock circuit 228, a status register 250, and an enable register 252. The RTC RAM 226B includes checksum data 227 and clock data 229. The battery 213 is coupled to provide power to the contents of the RTC battery well 225. The status register 250 is configured to store status information for the ASF capabilities of the computer system 200. The enable register 252 is configured to store a master bit that, when set, indicates that the ASF NIC 109 is not present. A slave bit may alternatively be stored that, when set, indicates that the ASF NIC 109 is present. It is noted that ASF registers 250 and 252 shown in FIG. 5 may each separately include one or more storage locations or a plurality of registers each having one or more storage locations.

The ASF south bridge 212 also includes, outside the RTC battery well 225, a CPU interface 232, power and system management units 233, and various bus interface logic circuits 234. Time and date data from the clock circuit 228 are stored as the clock data 229 in the RTC RAM 226B. The checksum data 227 in the RTC RAM 226B may be calculated based on the CMOS RAM 226A data and stored by the BIOS code during the boot process. The CPU interface 232 may include interrupt signal controllers and processor signal controllers. The power and system management units 233 may include an ACPI (Advanced Configuration and Power Interface) controller.

Figure 2:
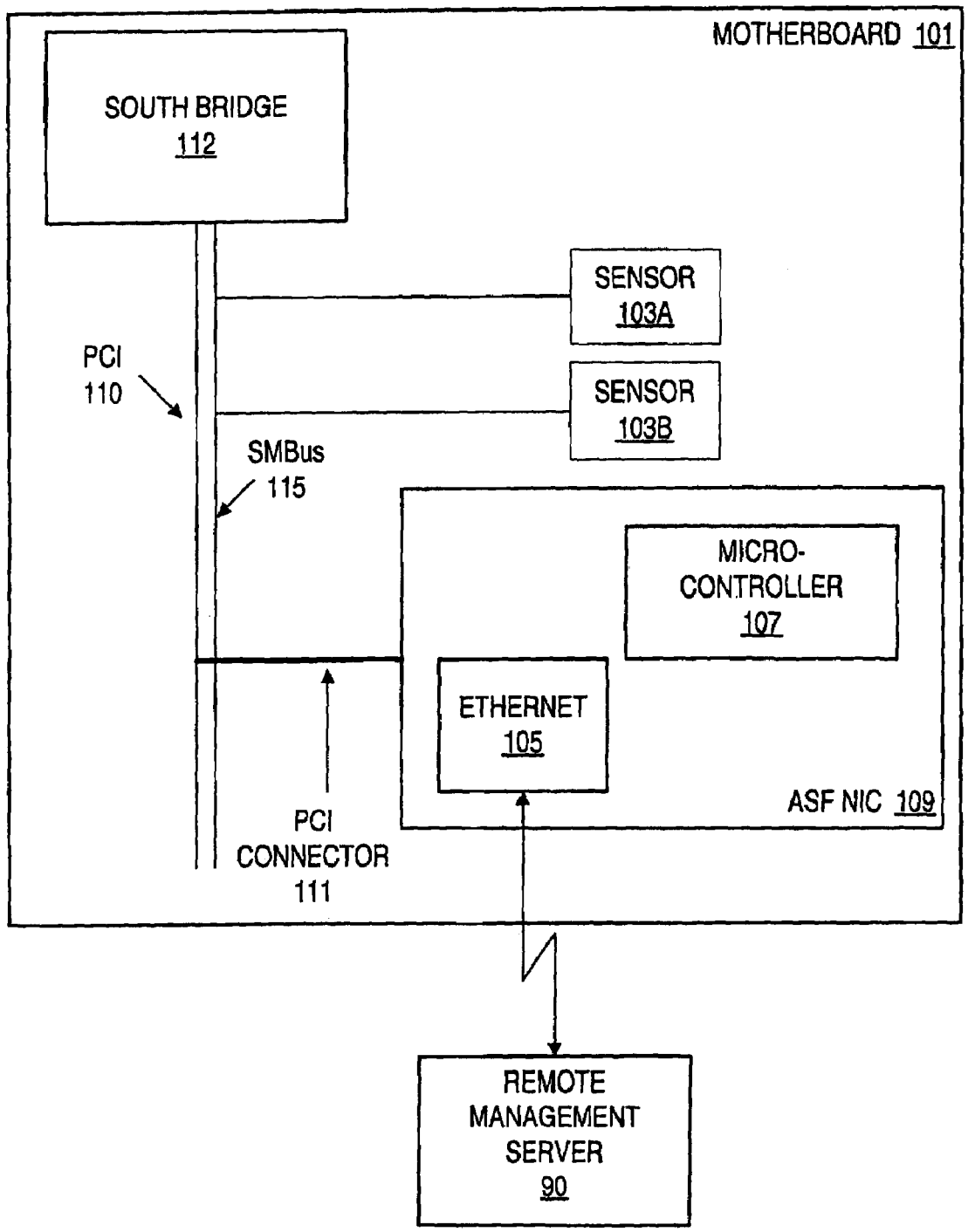
FIG. 2 illustrates a conventional method of booting a computer system.
Figure 6:
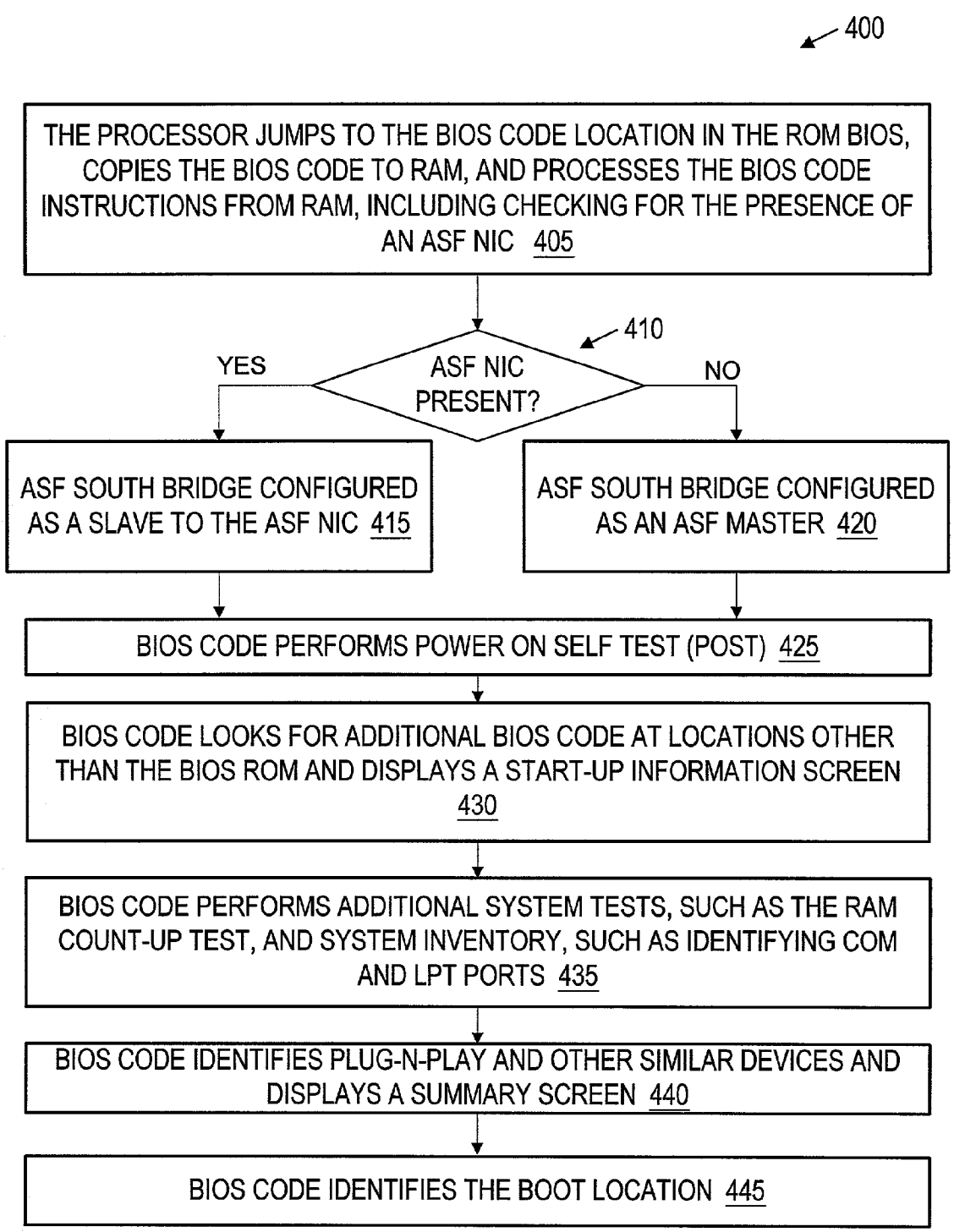
FIG. 6 illustrates a flowchart an embodiment of a method for booting a computer system including the ASF south bridge of FIG. 4, according to one aspect of the present invention.

FIG. 6 illustrates a flowchart of an embodiment of a method of initializing a computer system including the ASF south bridge 212. Various steps shown in FIG. 2 that are not shown or replaced in FIG. 6 are also contemplated as included in FIG. 6.

During initialization, the processor 202 reads the default jump location. The default jump location in memory is usually at a location such as FFFF0h. The processor 202 performs a jump to the appropriate BIOS code location (e.g. FFFF0h) in the ROM BIOS 222, copies the BIOS code to the RAM memory 206, and begins processing the BIOS code instructions from the RAM memory 206, in block 405. Processing the BIOS code instructions includes checking for the presence of an ASF NIC 109.

If the ASF NIC 109 is present, in decision block 410, then the method continues with block 415. If the ASF NIC 109 is not present, in decision block 410, then the method continues with block 420.

If the ASF NIC 109 is present, then the ASF south bridge 212 is configured as a slave to the ASF NIC 109, in block 415. If the ASF NIC 109 is not present, then the ASF south bridge 212 is configured as a master ASF device, in block 420. Blocks 415 and 420 are each followed by block 425.

The BIOS code, processed by the processor 202, performs a power-on self test (POST), in block 425. The BIOS code next looks for additional BIOS code, such as from a video controller, IDE controller, SCSI controller, etc. and displays a start-up information screen, in block 430. The BIOS code may perform additional system tests, such as a RAM memory count-up test, and a system inventory, including identifying COM (serial) and LPT (parallel) ports, in block 435. The BIOS code also identifies plug-and-play devices and other similar devices and then displays a summary screen of devices identified, in block 440. The BIOS code identifies the boot location, and the corresponding boot sector, in block 445.

Configuring the ASF south bridge 212 as a slave to the ASF NIC 109, in block 415, may include setting a bit indicating the slave condition in the ASF enable register 252. Configuring the ASF south bridge 212 as the ASF master, in block 420, may include setting a bit indicating the master condition in the ASF enable register 252.

Figure 7A:
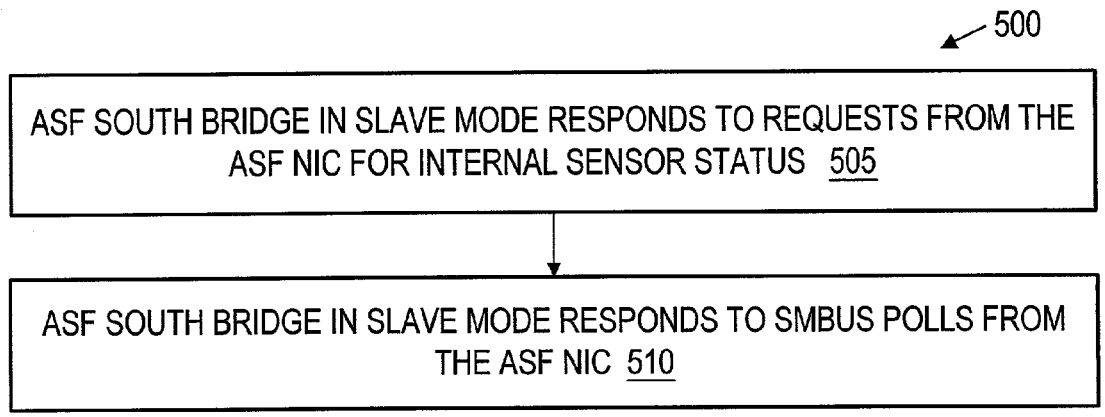
FIGS. 7A and 7B illustrate flowcharts of embodiments of method for operating a computer system including the ASF south bridge of FIG. 4, according to various aspects of the present invention.

FIG. 7A illustrates a flowchart of an embodiment of a method 500 for operating a computer system including the ASF south bridge 212 in slave mode, according to one aspect of the present invention. The method 500, in one embodiment, may be performed by a slave-mode application that is storable in the computer system 200. In slave mode, the ASF south bridge 212 responds to reads of internal sensor status by the ASF NIC 109, in block 505. The ASF south bridge 212 in slave mode responds to SMBus 215 polls originating on the ASF NIC 109, in block 510. The ASF south bridge 212 in slave mode also provides control points for the ASF NIC 109, allowing the ASF NIC 109 to reset the computer system 200 and cycle the power to the computer system 200.

Figure 7B:
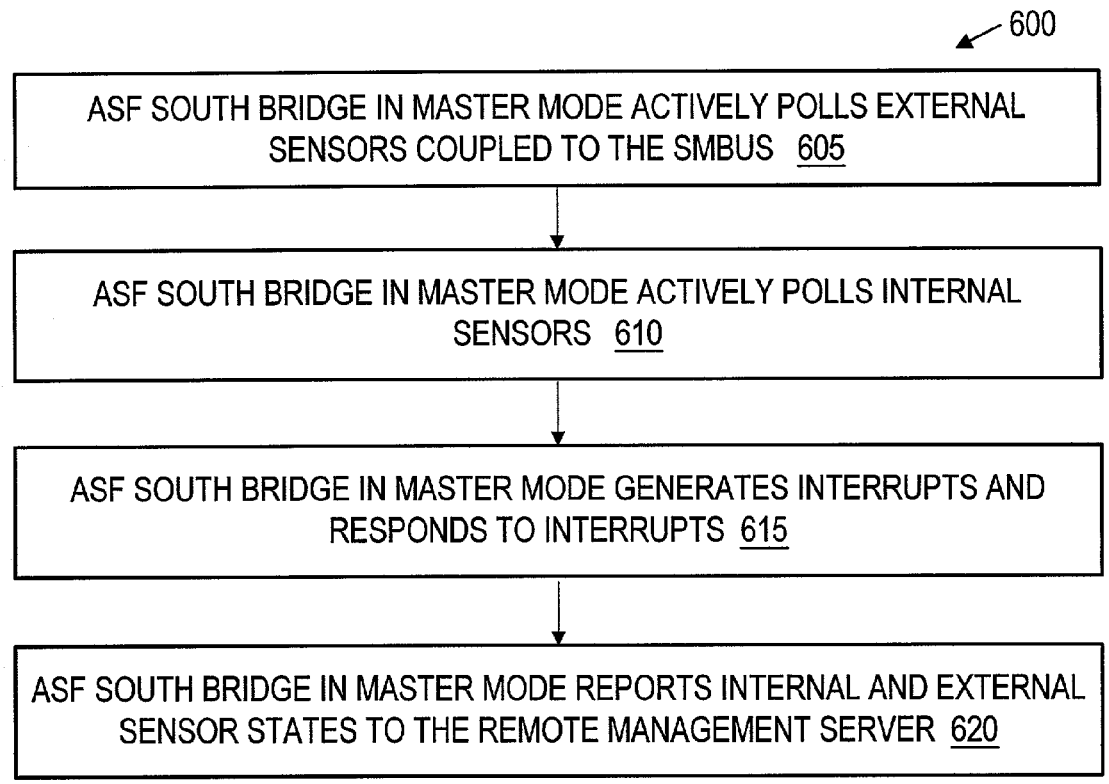

FIG. 7B illustrates a flowchart of an embodiment of a method 600 for operating a computer system including the ASF south bridge 212 in master mode, according to one aspect of the present invention. The method 600, in one embodiment, may be performed by a master-mode application that is storable in the computer system 200. In master mode, the ASF south bridge 212 actively polls (exemplary polling engine shown in FIG. 7C) external sensors coupled to the SMBus 215 at a programmable polling rate, in block 605. The ASF south bridge 212 in master mode actively polls or otherwise monitors internal sensor states, in block 610. The ASF south bridge 212 in master mode may generate interrupts and/or respond to interrupts, in block 615. Resulting external sensor status values are combined with internally monitored sensor values and reported to the remote management server 90 via the Ethernet core 344 in the ASF south bridge 212, in block 620.

Figure 7C:
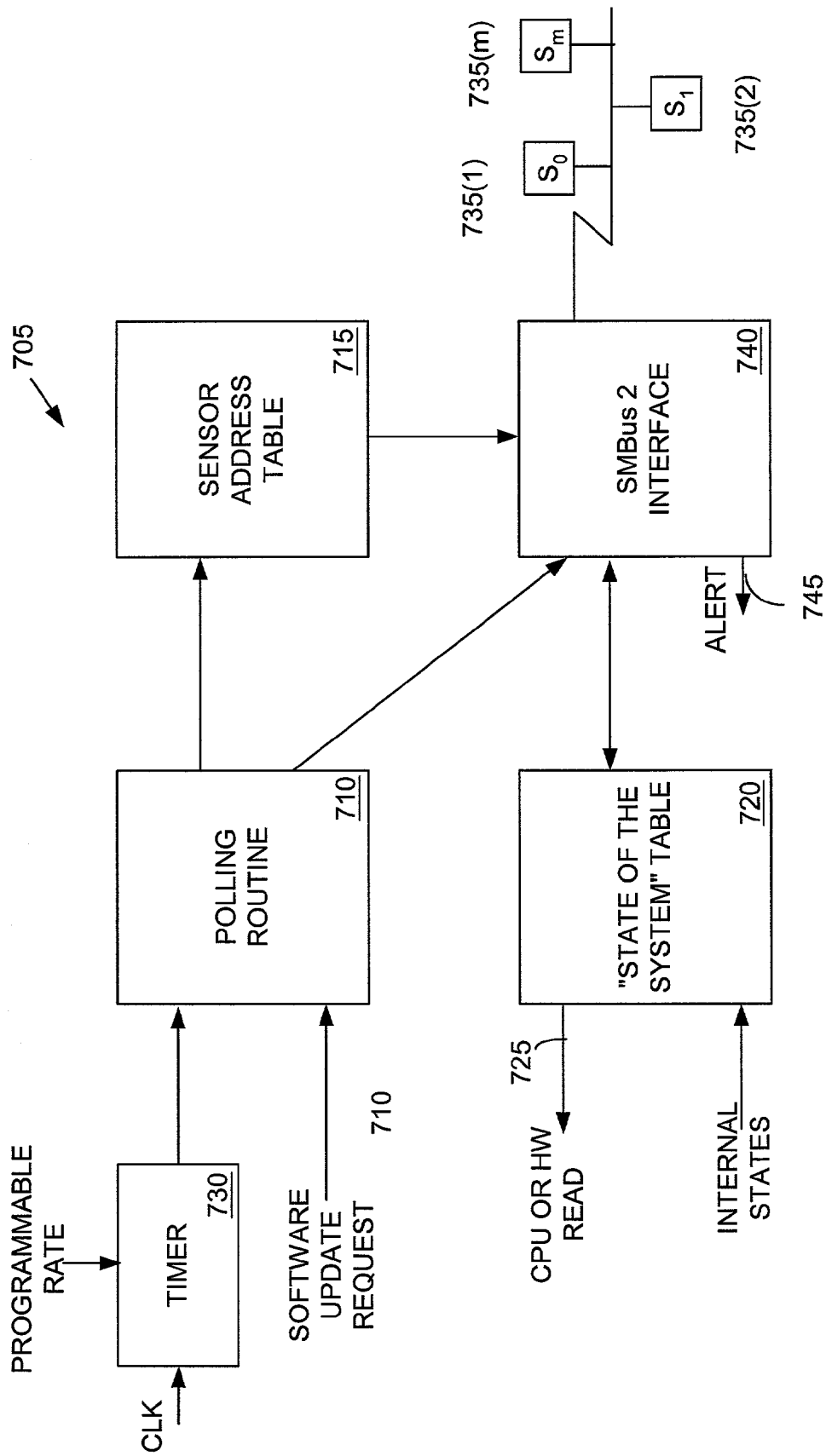
FIG. 7C illustrates a block diagram of a polling engine that may be employed in the computer system of FIGS. 3A and 3B, according to various aspects of the present invention.

FIG. 7C illustrates a block diagram of a polling engine 705 in accordance with one embodiment of the present invention. A polling routine 710, based on the sensors listed in a sensor address table 715, builds a current "state of the computer system" table 720. Thus, in one embodiment, the polling engine 705, depending on the mode (master or slave) of execution, continually accesses various internal and external sensors and builds a model of the state of the computer. The polling engine 705 may take action based on inappropriate (or undesirable) sensor values at the end of each polling cycle by sending PET messages, interrupts to the CPU of the computer system 200, and the like. In one embodiment, the CPU of the computer system 200 may access the table 720 directly, as indicated by line 725. Furthermore, in one embodiment, the polling engine 705 uses the values stored in the table 720 to construct responses (RMCP frames) to requests from the management console. The polling engine 705, in one embodiment, includes a timer 730 that defines the polling frequency set by a polling rate register (not shown). The timer 730 may be hardware based, or, alternatively, software based.

In the master mode, both internal and external sensors may be read, while in the slave mode, typically only the internal sensors are read. The external sensors 735(1-m) are read via the SMBus interface 740, in one embodiment. The SMBus interface 740 may report alerts over line 745. The polling operation may initiate master cycles on the SMBus 215 to read the various sensors in the computer system 200. As mentioned, the addresses and types of the sensors are stored in the sensor address table 715. An exemplary sensor address table 715 is shown in FIG. 7D.

Figure 8:
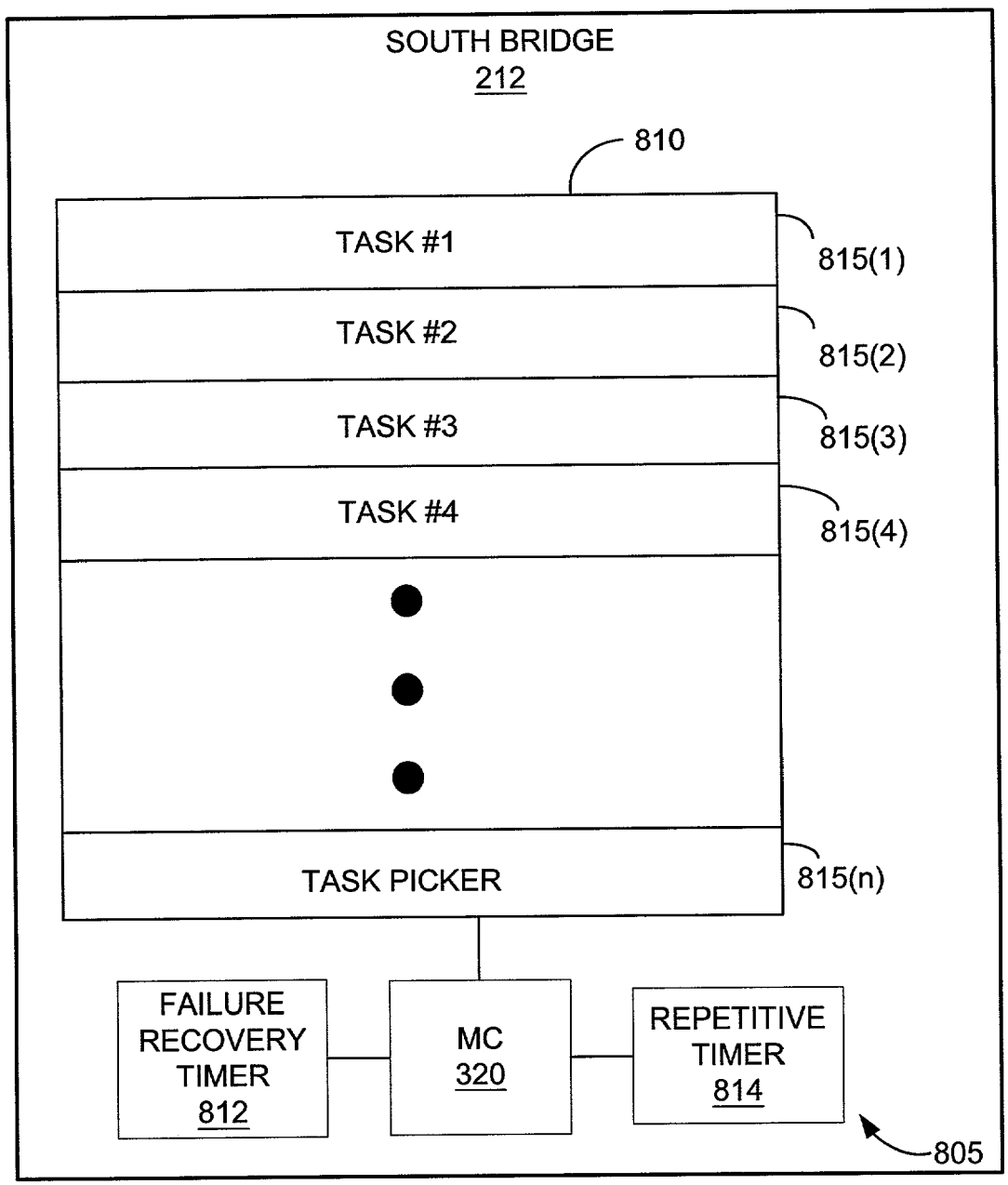
FIG. 8 illustrates a block diagram of a south bridge that may employed in the computer system of FIGS. 3A and 3B, according to various aspects of the present invention.

Referring now to FIG. 8, the south bridge 212 comprises a master control loop 805 that includes a queue 810 having a plurality of entries 815(1-n), where the last entry 815(n) in the queue 810 includes a task picker. As more fully explained below, the master control loop 805, which provides three general functions of handling interrupts, scheduling tasks, and idling, may be used by the master controller 320 to execute a variety of tasks. Although the queue 810 is described in the context of the south bridge 212, it should be appreciated that the queue 810 may be employed in a wide variety of other applications where it is desirable to execute one or more independent tasks and where fault-tolerance is desired should one or more of these tasks fail to complete successfully. Furthermore, the master control loop 805 is not limited to ASF applications, and thus may be applicable to non-ASF based applications as well.

As mentioned, in the illustrated embodiment, the master control loop 805 includes the task picker in the last entry 815(n) of the queue 810. One or more tasks, when posted in the queue 810, are executed in a preselected order. The exemplary queue 810 illustrated in FIG. 8 contains 4 tasks that have been posted in entries 815(1-4). For sake of illustration, it is assumed that task #1 in the entry 815(1) is the oldest task (i.e., was the first posted task), and that task #4 stored in the entry 815(4) is the newest task to be posted in the queue 810. In accordance with one embodiment, the task picker selects the tasks from the queue 810 based on a priority scheme for execution. For example, in one embodiment, the preselected order may be based on a first-in, first-out scheme (i.e., the order in which the tasks are posted in the queue 810). Thus, in the illustrated example of FIG. 9, task #1 (the oldest task) would be executed first and task #4 (the newest task) would be executed last. In other embodiments, the tasks may be executed using a user-designated priority scheme.

For ease of illustration, it is herein assumed that the task picker selects the tasks in the order in which they are posted. That is, in the illustrated embodiment, the task picker selects the oldest task in the queue 810 for execution, as described in more detail below. Once the task picker selects the task for execution, the selected task executes to completion and returns control to the task picker, which then selects the next task in the queue 810 for execution. The tasks are removed from the queue 810 upon execution. When no more tasks remain in the queue 810, the task picker, in one embodiment, continues to execute itself, and thus stays in an idle mode, until other tasks are posted in the queue 810.

The south bridge 212, in the illustrated embodiment, includes a failure recovery timer 812 that is capable of generating interrupts that may be detected by the master controller 320. In particular, the failure recovery timer 812, in one embodiment, may generate an interrupt during preselected time intervals. The preselected timer interval may be based, for example, on the amount of time that is required for the tasks in the queue 810 to complete executing. In one embodiment, the failure recovery timer 812, which may be a non-maskable timer that is implemented in hardware, may contain a digital counter that counts down to zero at a constant speed from a preset number. The counter speed may be kept constant by a conventional clock circuit (not shown). If the counter reaches zero before the task that is currently executing completes, the failure recovery timer 812 generates an interrupt. The failure recovery timer 812 may be resetable. The failure recovery timer 812, in one embodiment, may have a timeout value that is longer than any single task is expected to live. As such, a detection of an interrupt generated by the failure recovery timer 812 may be an indication that one or more tasks may be hung, and thus unable to complete.

In the illustrated embodiment, the south bridge 212 includes a repetitive timer 814 that, as described later in greater detail below, generates interrupts at fixed time intervals to handle tasks that are repetitively invoked.

Figure 9:
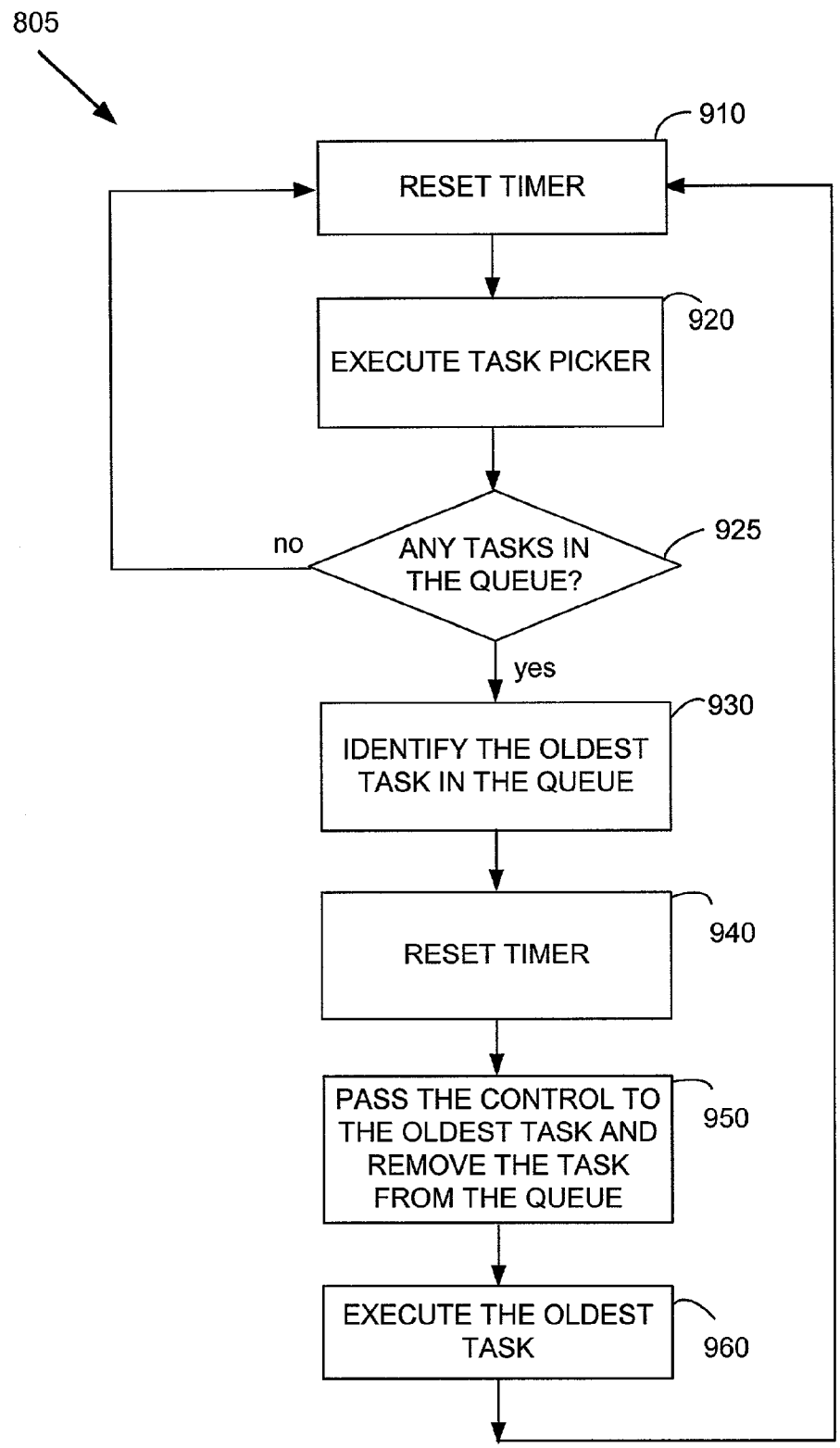
FIG. 9 illustrates a flow diagram of a master control loop that may be employed in the computer system of FIGS. 3A and 3B, according to various aspects of the present invention

Referring now to FIG. 9, a flow diagram of the master control loop 805 in accordance with one embodiment of the present invention is shown. The flow diagram of FIG. 9 begins with the failure recovery timer 812 being reset (at 910). The task picker, stored in the queue 810, is executed (at 920). The task picker determines (at 925) if any tasks (other than the task picker) have been posted in the queue 810. If it is determined (at 925) that no tasks other than the task picker exist in the queue 810, then the failure recovery timer 812 is reset (at 910) and the task picker is once again executed (at 920). The above-described routine may continue to repeat until another task is posted in the queue 810. In this manner, the task picker forms an idle loop for periods during which no new tasks are posted in the queue 810.

If it is determined (at 925) that a task other than the task picker exists in the queue 810, the task picker identifies (at 930) the oldest task relative to other tasks (not including the task picker) in the queue 810. If there is only one task in the queue 810, then that task is identified (at 930) as the oldest task. If there is more than one task in the queue 810, then the task that was posted first in the queue 810 is identified (at 930) as the oldest task. As mentioned earlier, for illustration purposes a first-in, first-out priority scheme is utilized for selecting tasks, although in other embodiments one of a variety of other priority schemes may be employed without departing from the spirit and scope of the instant invention.

The task picker resets (at 940) the failure recovery timer 812, and then passes (at 950) control to the oldest task identified (at 930) and removes the task from the queue 810. It should be appreciated that, in one embodiment, the failure recovery timer 812 may be reset (at 940) at substantially simultaneously the same time control is passed (at 950) to the oldest task identified (at 930) in the queue 810. Additionally, it should be appreciated that, based on design choice, the oldest task may be removed from the queue 810 before, at substantially the same time, or after the control is passed (at 950) to the oldest task that is identified (at 930) in the queue 810.

The oldest task identified (at 930) is executed (at 960). It should be appreciated that, in one embodiment, the oldest task may be removed (at 950) from the queue 810 upon execution of that task. Once the oldest task has completed executing (at 960), the failure recovery timer 812 is reset (at 910) and the control is passed to the task picker, which, upon execution (at 920), checks for other tasks in the queue 810. The above-described process is repeated until all of the posted tasks have been executed in the desired order, at which time the task picker stays in an idle mode. In one embodiment, the task picker may periodically poll to determine if any new tasks have been posted in the queue 810.

In one embodiment, the queue 810 may be a pointer that references a starting point of code that performs the desired task. As such, the task picker may look in the queue 810 and determine that a task exists. A "task" may be an address/handle pointing to code to be executed. The task picker may execute that code by making a call, where the argument of that call is the pointer in the queue 810. As a result, a program counter (not shown) is loaded with the address of the first instruction of that task. The task will then execute. The last instruction of that task, upon execution, restores the program counter with the address of the task picker, such that the task picker is executed again upon completion of the previous task.

Figure 10:
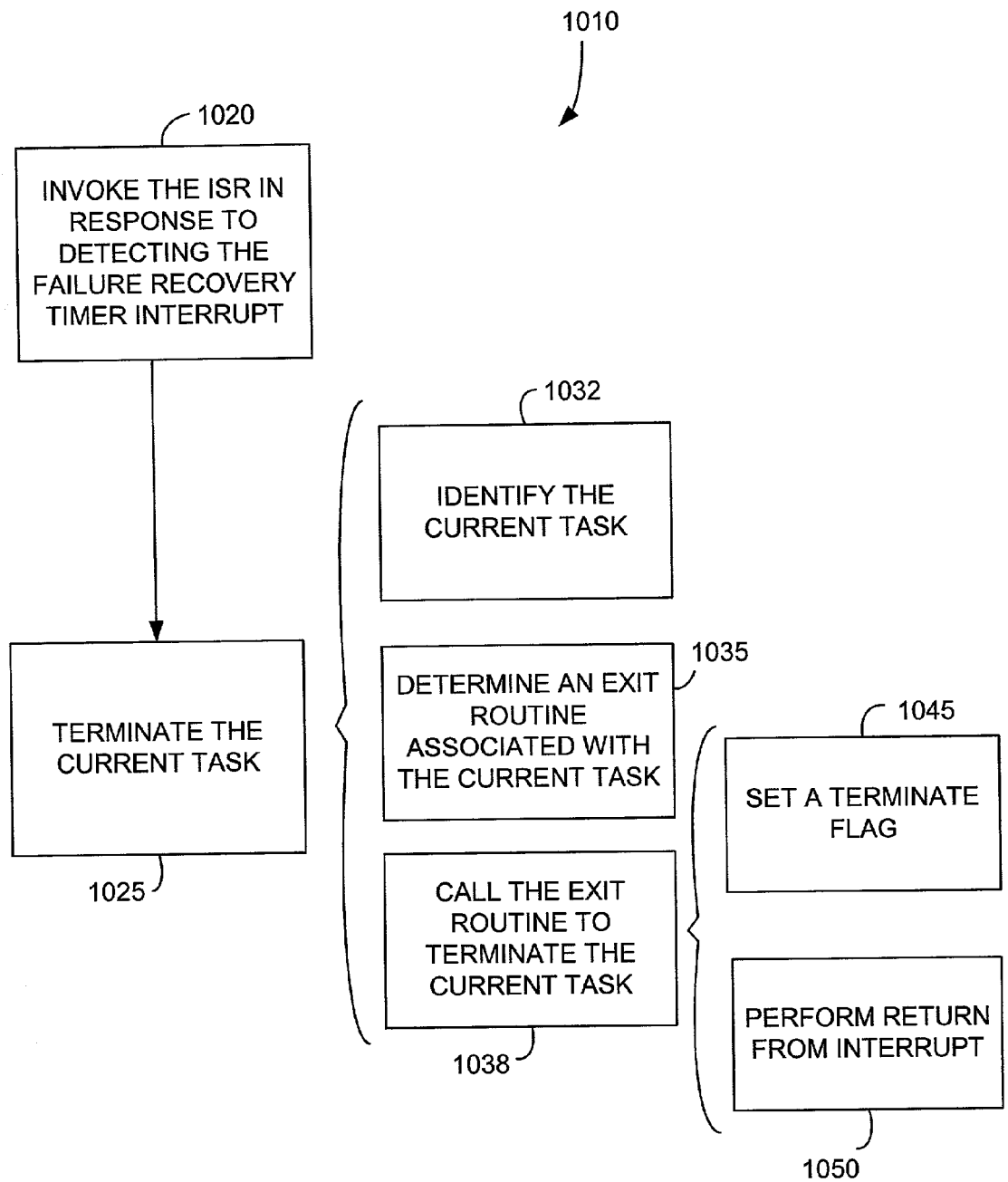
FIG. 10 depicts a flow diagram of an interrupt service routine that may be employed with the master control loop of FIG. 9, according to various aspects of the present invention

In one embodiment, the master control loop 805 of FIG. 9 is capable of responding to interrupts. As more fully explained below, the master control loop 805 may respond to a variety of interrupts, including those that are generated by the failure recovery timer 812 or those that are generated to post one or more tasks in the queue 810. The failure recovery timer 812 may be capable of generating interrupts at preselected time intervals, as indicated above. Generally, these interrupts are utilized by the MC 320 to terminate any tasks that may not have successfully completed within the prescribed time. Interrupts generated by the failure recovery timer 812 are handled by an interrupt service routine 1010, a flow diagram of which is shown in FIG. 10, in accordance with one embodiment of the present invention.

The interrupt service routine (ISR) 1010 is invoked (at 1020) in response to detecting an interrupt that is generated by the failure recovery timer 812. The ISR 1010, based on detecting the generated interrupt, terminates (at 1025) the task that is currently being executed from the queue 810. Upon termination (at 1025) of the current task, the ISR 1010, in one embodiment, returns the control to the task picker, which may then poll the queue 810 for additional, if any, tasks needing to be serviced.

The act of terminating (at 1025) the current task, in one embodiment, may comprise identifying (1032) the task that is currently executing, determining (at 1035) an exit routine associated with that task, and calling (at 1038) the exit routine to terminate. In accordance with one embodiment, the tasks posted in the queue 810 include an exit routine that may be capable of terminating that task. The act of calling (at 1038) the exit routine, in one embodiment, may include the exit routine setting (at 1045) a "terminate" flag and performing (at 1050) a return from the interrupt. When control is returned from the interrupt to the currently executing task, control returns to the task picker in the queue 810. Thus, the above-identified blocks 1045 and 1050, in one embodiment, may be performed by the exit routine associated with the currently executing task. The exit routine associated with a particular task that is currently executing may perform, if invoked, additional cleanup steps to facilitate the termination of that task.

Figure 11:
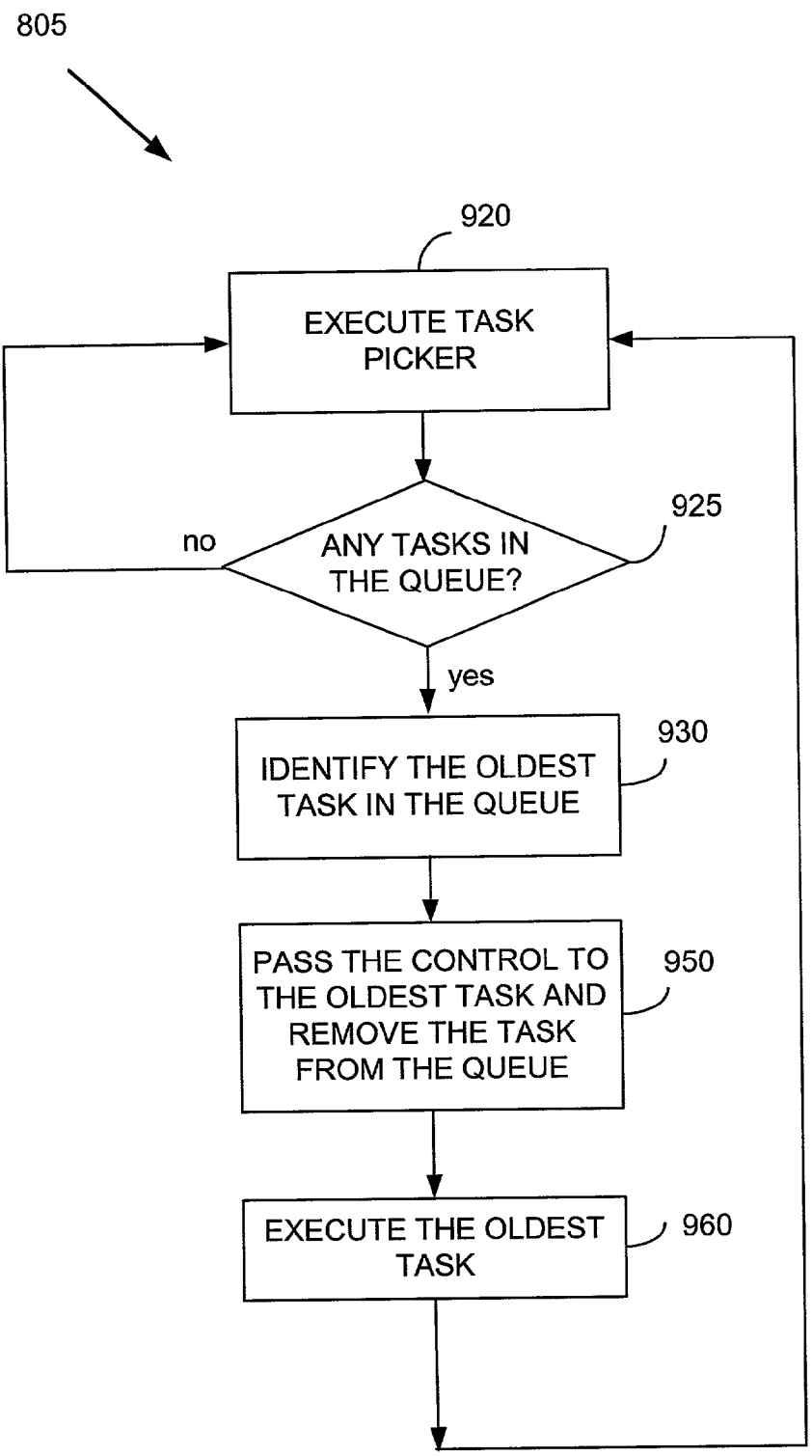
FIG. 11 illustrates a flow diagram of an alternative embodiment of the mater control loop of FIG. 9, according to various aspects of the present invention.

Referring now to FIG. 11, an alternative embodiment of a flow diagram of the master control loop 805 is shown. The illustrated alternative embodiment of the master control loop 805 of FIG. 11 is similar to that of FIG. 9 except this embodiment does not require the failure recovery timer 812 to be reset. Accordingly, as indicated by the use of like reference numerals, the flow diagram of FIG. 11 includes the same blocks as that of FIG. 9 but omits blocks 910, 940, which call for resetting the failure recovery timer 812. As described in more detail below, the master control loop 805 of FIG. 11, in the illustrated embodiment, does not require the failure recovery timer 812 to be reset before execution of each task in the queue 810.

In one embodiment, the oldest task, when executed (at 960), programs the failure recovery timer 812 to generate an interrupt after a preselected time interval, where the preselected time interval substantially corresponds to the amount of time required for the task to complete execution. Thus, if the task fails to complete executing within the preselected time interval, it may be terminated. In this manner, the failure recovery timer 812 may be programmed to generate an interrupt at different time intervals, depending on the task that is executed at that time. In one embodiment, the preselected time interval may be any desirable time interval greater than the time required for the task to complete executing.

Figure 12:
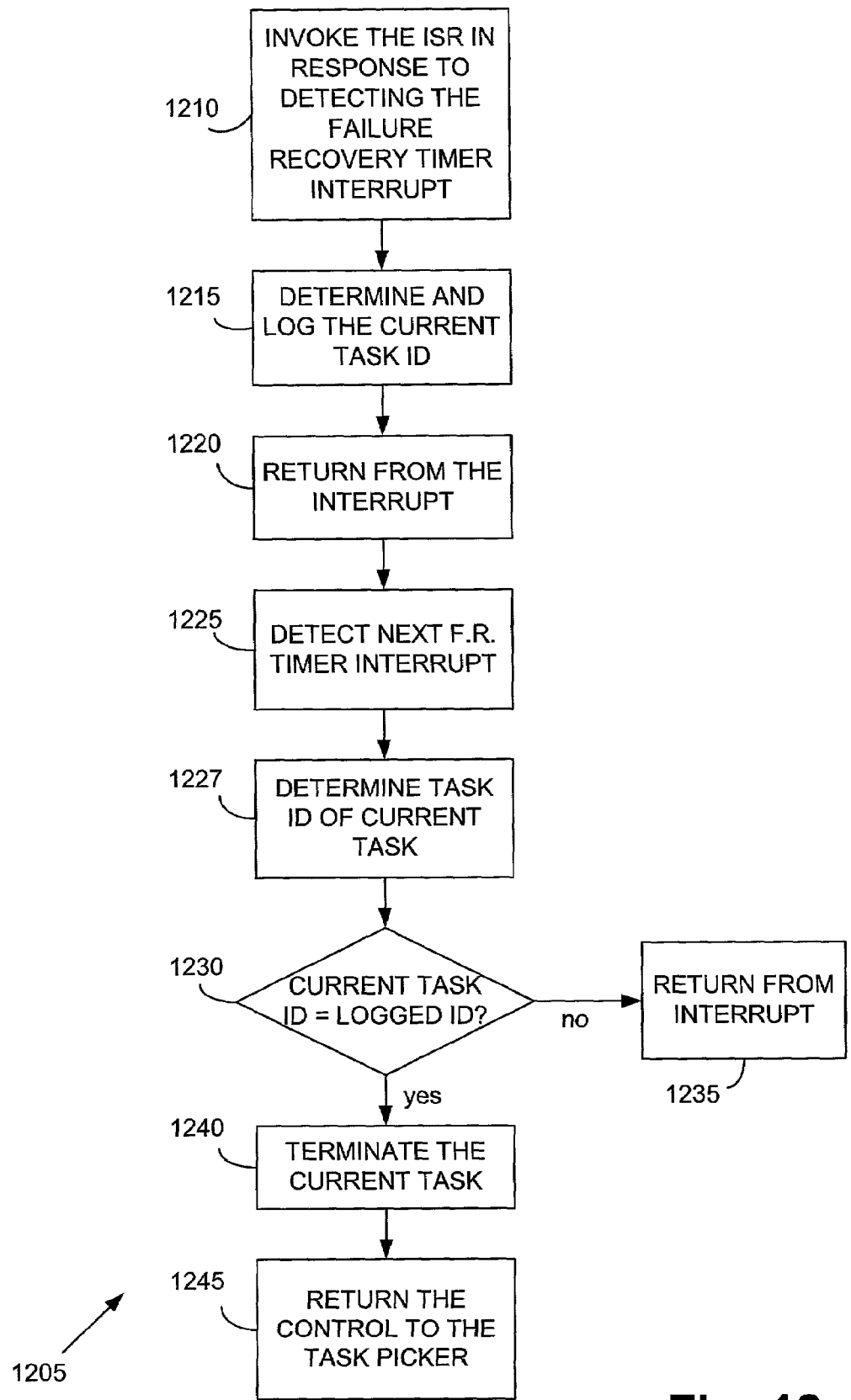
FIG. 12 depicts a flow diagram of an interrupt service routine that may be employed with the master control loop of FIG. 11, according to various aspects of the present invention.

FIG. 12 illustrates a flow diagram of an interrupt service routine (ISR) 1205 that handles the interrupts that are generated by the failure recovery timer 812 for the master control loop 805 of FIG. 11. It is herein assumed that the failure recovery timer 812 generates an interrupt at every pre-selected time interval, where the pre-selected time interval is sufficient time for executing any given task that is posted in the queue 810. The ISR 1205 is invoked (at 1210) in response to detecting an interrupt that is generated by the failure recovery timer 812. The ISR 1205, in response to detecting the interrupt, determines and logs (at 1215) the current task ID of the task that is executing from the queue 810 at the time the interrupt is detected (at 1210). The ISR 1205 returns (at 1220) from the interrupt to the task that is currently executing. The ISR 1205 detects (at 1225) the next interrupt that is generated by the failure recovery timer 812, and determines (at 1227) the task ID of the task that was executing at the time the interrupt is generated.

The ISR 1205 determines (at 1230) if the current task ID is the same as the task ID that was logged (at 1215) during the previous interrupt. If the two task IDs are not the same, then the ISR 1205 returns (at 1235) from the interrupt and returns control to the currently executing task. If the two task IDs are not the same, then it is an indication that the same task has not been executing between the last two successive interrupts, which means that the task that was logged (at 1215) has since completed successfully and that a different task is in the process of being executed. The "task ID," in one embodiment, may be a 16-bit sequence number that is incremented each time the task is invoked to reduce the chances of the task that repeats frequently from being mistakenly terminated.

If the ISR 1205 determines (at 1230) that the current task ID is the same as the task ID logged (at 1215), then the ISR 1205 terminates (at 1240) the current task. The current task is terminated (at 1240) because the same task has been executing between two successive interrupts, which may be an indication that the current task is hung or unable to complete execution, considering the fact that under normal conditions the task should have completed within one full interrupt interval. Upon termination (at 1240) of the current task, in one embodiment, control is returned (at 1245) to the task picker.

The master control loop 805 of FIG. 8 allows the computer system 200 to be more fault tolerant. Fault tolerance is a desirable feature in a system, particularly in a system where polling occurs. In the above-described master control loop 805, errant tasks may be terminated, thereby allowing the computer system 200 to continue operating. In some instances, errant tasks may be a result of an application that continues to post tasks periodically in the queue 810 but the posted tasks fail to complete for selected reasons. For example, a keyboard application may use the queue 810 to poll some hardware in the computer system 200 every few seconds to check if that hardware is present. If, however, the polled hardware is, for instance, temporarily removed from the computer system 200, the tasks checking for such hardware may fail, and thus not complete. The master control loop 805, in one embodiment, continues to terminate the hung tasks until the hardware is once again detected in the computer system 200. In this manner, the computer system 200 operates in a substantially seamless manner, at least from the end user's perspective, from the point the polled hardware is not detected to a point the hardware is eventually detected in the computer system 200.

A variety of applications or devices in the computer system 200 (see FIGS. 3A and 3B) may post tasks in the queue 810 for execution. For example, the CPU of the computer system 200 may post tasks in the queue 810 to access one or more sensors coupled to the SMBus 215 (see FIGS. 3A and 3B). Once the task is posted in the queue 810, the MC 320 may execute the task to provide the requested information from the sensors on the SMBus 215. In one embodiment, the CPU of the computer system 200 may generate an MC 320 interrupt request and pass a task vector to the MC 320. The CPU may write to an interrupt trap register of the MC 320 that generates an MC 320 interrupt. The write operation may generate an interrupt, and thereafter data may be exchanged via a data exchange register, for example.

In addition to the CPU, other devices and applications, such as the master-mode application, slave-mode application, keyboard application (i.e., application for managing keyboard operation), and the like, may also post a variety of tasks in the queue 810 for execution. Some exemplary tasks that may be posted in the queue 810, and the manner in which these tasks may be posted, are described in greater detail below.

When configured to operate in the master mode, the master-mode application of the south bridge 212 actively polls external sensors coupled to the SMBus 215 as well as internal sensors. The term "sensor," as utilized herein, refers to any hardware source of status information. "Polling" the external or internal sensors periodically is one example of a task that may be posted in the queue 810 for execution. Polling is one example of a task that is repetitively invoked. Repetitive tasks, in accordance with one embodiment, may be handled in a variety of ways, including through the use of interrupt service routines and posting the task on the queue 810 in response to an interrupt generated by the repetitive timer 814. For performance and reliability reasons, it may be desirable not to burden interrupt service routines to perform time-consuming tasks. As such, in some instances it may be desirable to use interrupt service routines generally for short operations, such as resetting a timer or reading a status register to detect a change, for example.

The repetitive timer 814, in one embodiment, generates an interrupt at preselected time intervals. The interrupt is in turn serviced by an interrupt service routine that determines the source of the interrupt, determines what is needed to respond to the interrupt, and posts one or more tasks in the queue 810 to properly address or service the interrupt. Once the tasks are posted in the queue 810, the task picker of the master control loop 810 processes those tasks whenever possible. Deferring the tasks to the queue 805 allows the interrupt service routines to make a quick and clean exit. It should be noted that in accordance with one embodiment of the present invention, repetitive (e.g., polling) tasks may be posted by either the master-mode application, the slave-mode application, or any other application requiring such tasks to be serviced.

In one embodiment, the repetitive timer 814 may be used to load more than one task into the queue 810 per timeout. In one embodiment, a more robust polling mechanism may be utilized where the interrupt service routine builds one or more programmable timers that control separate tasks with different frequencies (the repeat time may be an integer multiple of the time base of the repetitive timer 814).

In the master mode, as mentioned above, Ethernet packets are constructed by the master controller 320 and stored in the transmit buffer 326 (see FIG. 4). In particular, in one embodiment, various PET, RMCP response, and RMCP ACK/NACK packets are created by the master controller 320 and stored in the transmit buffer 326. Additionally, during the master mode, a variety of packets are extracted from Ethernet packets stored from the receive buffer 328 (see FIG. 4). The task of constructing and deconstructing Ethernet frames may be placed on the queue 810, in one embodiment, by the master-mode application. The master controller 320, when possible, may process the tasks from the queue 810 once they are posted.

The south bridge 212, in one embodiment, supports SMBus master emulation and slave emulation modes. In the master mode, the transactions may be initiated by either the master controller 320 or the CPU of the computer system 200. When in the slave mode, the SMBus 215 is the target of messages from the SMBus master on the NIC 109. In the slave mode, the south bridge 212 should recognize transactions targeting its address and respond accordingly and also respond to the inbound address resolution protocol enumeration cycles, in one embodiment. The tasks associated with the SMBus emulation modes may be placed on the queue 810 for execution by the master controller 320.

For the purposes of this disclosure, references to ROM are to be construed as also applying to flash memory and other substantially non-volatile memory types. Note that while the methods of the present invention disclosed herein have been illustrated as flowcharts, various elements of the flowcharts may be omitted or performed in different order in various embodiments. Note also that the methods of the present invention disclosed herein admit to variations in implementation.

Some aspects of the invention as disclosed above may be implemented in hardware or software. Thus, some portions of the detailed descriptions herein are consequently presented in terms of a hardware implemented process and some portions of the detailed descriptions herein are consequently presented in terms of a software-implemented process involving symbolic representations of operations on data bits within a memory of a computing system or computing device. These descriptions and representations are the means used by those in the art to convey most effectively the substance of their work to others skilled in the art using both hardware and software. The process and operation of both require physical manipulations of physical quantities. In software, usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g. a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer implemented method, comprising:
storing one or more tasks in a queue at a plurality of preselected time intervals, wherein each task has an associated exit routine;
determining at least one task to process based on a priority scheme;
processing the at least one task; and
calling the exit routine based on determining that the task has not completed processing within a preselected execution period.

2. The computer implemented method of claim 1, further comprising generating an interrupt, and wherein storing the one or more tasks in the queue comprises storing the one or more tasks in the queue in response to detecting the interrupt.

3. The computer implemented method of claim 1, wherein determining at least one task to process based on the priority scheme comprises determining the at least one task based on a first-in, first-out priority scheme.

4. The computer implemented method of claim 1, wherein calling the exit routine comprises terminating the task currently processing and returning control to a task picker in the queue.

5. The computer implemented method of claim 1, wherein processing the at least one task comprises executing the task and programming a timer to generate an interrupt after a preselected time, wherein the preselected time corresponds to the amount of time required for the task to complete executing.

6. A computing apparatus, comprising:
a queue having a task picker stored therein, the task picker being configured to:
determine if at least one task other than the task picker is stored in the queue;
transfer control to the at least one task other than the task picker based on determining that the at least one task other than the task picker is stored in the queue so that the at least one task other than the task picker can execute; and
execute in response to the at least one task other than the task picker completing execution and continue executing until a preselected event occurs.

7. The apparatus of claim 6, wherein the preselected event comprises detection of an interrupt.

8. The apparatus of claim 6, wherein the preselected event comprises detection of another task being present in the queue.

9. The apparatus of claim 6, wherein each task stored in the queue comprises an exit routine to terminate that task.

10. The apparatus of claim 6, wherein the task picker determines that more than one task is stored in the queue and wherein the task picker selects a task to execute from the one or more tasks based on a priority scheme.

11. The apparatus of claim 10, wherein the priority scheme is a first-in, first-out scheme.

12. An article comprising one or more machine-readable storage media containing instructions that when executed enable a processor to:
store one or more tasks in a storage space at a plurality of preselected time intervals, wherein each task has an associated exit routine;
determine at least one task to process based on a priority scheme;
process the at least one task; and
call the exit routine based on determining that the task cannot be processed to completion.

13. The article of claim 12, wherein the instructions when executed enable the processor to generate an interrupt and store the one or more tasks in the storage space in response to detecting the interrupt.

14. The article of claim 12, wherein the instructions when executed enable the processor to determine the at least one task based on a first-in, first-out priority scheme.

15. The article of claim 12, wherein the instructions when executed enable the processor to terminate the task currently processing and return control to a task picker in the storage space.

16. The article of claim 12, wherein the instructions when executed enable the processor to execute the task and to program a time to generate an interrupt at a preselected time, wherein the preselected time is greater than the time required for the task to complete executing.

17. An apparatus, comprising:
a queue having a task picker stored therein, the queue adapted to store one or more tasks, and the task picker being configured to:
select a task from the queue to execute based on a priority scheme;
transfer control to the task so that the task can execute;
a failure recovery timer to generate an interrupt at preselected time intervals, wherein each preselected time interval is greater than the time it takes for each of the tasks stored in the queue to execute; and
a controller adapted to:
determine if the task completes execution within the preselected time interval;
terminate the task in response to determining that the task failed to complete within the preselected time interval; and
execute the task picker in response to terminating the task.

18. The apparatus of claim 17, wherein the priority scheme is based on a first-in, first-out scheme.

19. The apparatus of claim 17, wherein each task has an associated exit routine and wherein the controller terminates the task by calling the exit routine.

20. The apparatus of claim 17, wherein the controller resets the failure recovery timer before executing the task.

21. The apparatus of claim 17, wherein the controller determines if the task completes execution within the preselected time interval comprises:
detecting a first failure recovery interrupt;
causing an interrupt service routine to determine a task ID associated with a task executing at the time of the first failure recovery interrupt;
logging the determined task ID;
detecting a second failure recovery interrupt;
determining a task ID associated with a task executing at the time of the second failure recovery interrupt; and
terminating the task executing at the time of the second failure recovery interrupt in response to determining that the two task IDs are the same.

22. The apparatus of claim 17, further comprising a repetitive timer for generating interrupts on a periodic basis, wherein the controller posts a task in the queue in response to detecting an interrupt generated by the repetitive timer.

23. The apparatus of claim 17, wherein the controller resets the failure recovery timer before executing the task picker.

* * * * *